(12) United States Patent
Källén

(10) Patent No.: US 12,504,990 B2
(45) Date of Patent: *Dec. 23, 2025

(54) COMMON PRIORITY INFORMATION FOR MULTIPLE RESOURCE ARBITRATION

(71) Applicant: Imagination Technologies Limited, Kings Langley (GB)

(72) Inventor: Jonas Olof Gunnar Källén, Hisings Backa (SE)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,728

(22) Filed: Jun. 7, 2024

(65) Prior Publication Data
US 2024/0320039 A1 Sep. 26, 2024

Related U.S. Application Data

(63) Continuation of application No. 16/362,960, filed on Mar. 25, 2019, now Pat. No. 12,008,397.

(30) Foreign Application Priority Data

Mar. 23, 2018 (GB) ..................................... 1804748
Mar. 23, 2018 (GB) ..................................... 1804750

(51) Int. Cl.
*G06F 9/48* (2006.01)
*G06F 9/50* (2006.01)
(Continued)

(52) U.S. Cl.
CPC .............. *G06F 9/4881* (2013.01); *G06F 9/48* (2013.01); *G06F 9/4806* (2013.01);
(Continued)

(58) Field of Classification Search
CPC ...... G06F 13/16; G06F 13/1605; G06F 13/18; G06F 13/20; G06F 9/48; G06F 9/4806;
(Continued)

(56) References Cited

U.S. PATENT DOCUMENTS 6,467,002 B1  10/2002  Yang
7,382,794 B1   6/2008  Zheng et al.
(Continued)

FOREIGN PATENT DOCUMENTS

CN    102752844 B    10/2014
CN    104123288 A    10/2014
CN    105743962 A     7/2016

*Primary Examiner* — Charles M Swift
(74) *Attorney, Agent, or Firm* — Potomac Law Group, PLLC; Vincent M DeLuca

(57) ABSTRACT

Methods and systems for generating common priority information for a plurality of requestors in a computing system that share a plurality of computing resources for use in a next cycle to arbitrate between the plurality of requestors, include generating, for each resource, priority information for the next cycle based on an arbitration scheme; generating, for each resource, relevant priority information for the next cycle based on the priority information for the next cycle for that resource, the relevant priority information for a resource being the priority information that relates to requestors that requested access to the resource in the current cycle and were not granted access to the resource in the current cycle; and combining the relevant priority information for the next cycle for each resource to generate the common priority information for the next cycle.

18 Claims, 21 Drawing Sheets

(51) Int. Cl.
*G06F 13/16* (2006.01)
*G06F 13/18* (2006.01)
*G06F 13/20* (2006.01)
*G06F 13/28* (2006.01)
*G06F 13/364* (2006.01)
*G06F 16/90* (2019.01)
*G06F 16/901* (2019.01)

(52) U.S. Cl.
CPC .......... *G06F 9/4818* (2013.01); *G06F 9/4831* (2013.01); *G06F 9/50* (2013.01); *G06F 9/5005* (2013.01); *G06F 9/5027* (2013.01); *G06F 9/5038* (2013.01); *G06F 13/16* (2013.01); *G06F 13/1605* (2013.01); *G06F 13/18* (2013.01); *G06F 13/20* (2013.01); *G06F 13/28* (2013.01); *G06F 13/364* (2013.01); *G06F 16/9027* (2019.01)

(58) Field of Classification Search
CPC .... G06F 9/4818; G06F 9/4831; G06F 9/4843; G06F 9/4881; G06F 9/50; G06F 9/5005; G06F 9/5027; G06F 9/5038
See application file for complete search history.

(56) References Cited

U.S. PATENT DOCUMENTS

| | | |
|---|---|---|
| 7,979,615 B1 | 7/2011 | Spitzer |
| 8,531,955 B2 | 9/2013 | Dennis |
| 8,673,976 B2 | 3/2014 | Yoshikawa et al. |
| 8,676,976 B2 | 3/2014 | Heller, Jr. |
| 10,901,922 B2 * | 1/2021 | Källén .................. G06F 13/18 |
| 2003/0229743 A1 | 12/2003 | Brown |
| 2005/0114415 A1 | 5/2005 | Bosshart |
| 2005/0204085 A1 | 9/2005 | Fukuyama et al. |
| 2011/0153892 A1 | 6/2011 | Shindo et al. |
| 2012/0254882 A1 | 10/2012 | Makljenovic et al. |
| 2014/0006665 A1 | 1/2014 | Amano et al. |
| 2014/0189698 A1 | 7/2014 | Choquette et al. |
| 2015/0169366 A1 | 6/2015 | Billore et al. |
| 2015/0347327 A1 | 12/2015 | Blaine et al. |
| 2016/0182345 A1 | 6/2016 | Herdrich et al. |

\* cited by examiner

CYCLE 1

ACTIVE_0 = [ 1 1 1 0 0 0 0 0 ]

ACTIVE_1 = [ 0 0 0 0 0 1 1 1 ]

COMMON PRIORITY = [ 0 0 0 0 1 1 1 1 ]

RS_0 = REQUESTOR 2, RS_1 = REQUESTOR 5

NEXT_PRIORITY_0 = [ 1 1 0 1 1 1 1 1 ]

RELEVANT_NEXT_PRIORITY_0 = [ 1 1 0 0 0 0 0 0 ]

NEXT_PRIORITY_1 = [ 0 0 0 0 0 0 1 1 ]

RELEVANT_NEXT_PRIORITY_1 = [ 0 0 0 0 0 0 1 1 ]

COMMON_NEXT_PRIORITY = [ 1 1 0 0 0 0 1 1 ]

CYCLE 2

ACTIVE_0 = [ 1 1 0 1 1 0 0 0 ]

ACTIVE_1 = [ 0 0 1 0 0 0 1 1 ]

COMMON PRIORITY = [ 1 1 0 0 0 0 1 1 ]

RS_0 = REQUESTOR 0, RS_1 = REQUESTOR 6

NEXT_PRIORITY_0 = [ 0 1 1 1 1 1 1 1 ]

RELEVANT_NEXT_PRIORITY_0 = [ 0 1 0 1 1 0 0 0 ]

NEXT_PRIORITY_1 = [ 0 0 0 0 0 0 0 1 ]

RELEVANT_NEXT_PRIORITY_1 = [ 0 0 0 0 0 0 0 1 ]

COMMON_NEXT_PRIORITY = [ 0 1 0 1 1 0 0 1 ]

FIG. 19

COMMON PRIORITY INFORMATION FOR MULTIPLE RESOURCE ARBITRATION

CROSS-REFERENCE TO RELATED APPLICATIONS AND CLAIM OF PRIORITY

This application is a continuation, under 35 U.S.C. 120, of copending application Ser. No. 16/362,960 filed Mar. 25, 2019, now U.S. Pat. No. 12,008,397, which claims foreign priority under 35 U.S.C. 119 from United Kingdom Application Nos. 1804748.0 and 1804750.6, both filed Mar. 23, 2018, the contents of which are incorporated by reference herein in their entirety.

BACKGROUND

Many computer systems have resources that can receive more requests in a particular cycle than can be processed in that cycle. This often occurs when a resource is shared between multiple requestors. For example, a memory cache that can only execute, or process, one request per cycle may be shared by four requestors that can simultaneously request access to the cache. In such cases, an arbiter may be used to determine the order in which the requests will be processed. Specifically, the arbiter receives the requests from the requestors and selects which request is to be processed by the resource in accordance with an arbitration scheme (e.g. a rule or set of rules). In many cases, the arbitration scheme is based on priorities assigned to the requestors so that requests from higher priority requestors are granted before requests from lower priority requestors. However, other arbitration schemes may also be used to prioritize the requestors and/or requests according to a specified arbitration scheme.

It is generally desirable that the arbitration scheme ensures that all of the requestors gain access to the shared resource eventually (i.e. that none of the requestors are starved out). It is also generally desirable that the arbitration scheme minimize the maximum time that a requestor may have to wait to gain access to the resource. In many cases, it is also desirable that the arbitration is fair (i.e. that the requestors are granted access roughly equally often).

Since a requestor cannot gain access to a shared resource until the arbiter has selected which request is to be processed by the resource in the current cycle, it is important that the arbiter be able to select the request to be processed quickly.

The embodiments described below are provided by way of example only and are not limiting of implementations which solve any or all of the disadvantages of known arbiters and/or arbitration schemes.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for generating common priority information for a plurality of requestors in a computing system that share a plurality of computing resources for use in a next cycle to arbitrate between the plurality of requestors. The method includes generating, for each resource, priority information for the next cycle based on an arbitration scheme; generating, for each resource, relevant priority information for the next cycle based on the priority information for the next cycle for that resource, the relevant priority information for a resource being the priority information that relates to requestors that requested access to the resource in the current cycle and were not granted access to the resource in the current cycle; and combining the relevant priority information for the next cycle for each resource to generate the common priority information for the next cycle.

A first aspect provides a method of generating common priority information for a plurality of requestors in a computing system that share a plurality of computing resources for use in a next cycle to arbitrate between the plurality of requestors, the method comprising: generating, for each resource, priority information for the next cycle based on an arbitration scheme, the priority information indicating which of the plurality of requestors has priority in the next cycle; generating, for each resource, relevant priority information for the next cycle based on the priority information for the next cycle for that resource, the relevant priority information for a resource being the priority information that relates to requestors that requested access to the resource in the current cycle and were not granted access to the resource in the current cycle; and combining the relevant priority information for the next cycle for each resource to generate the common priority information for the next cycle.

A second aspect provides priority selection logic to generate common priority information for a plurality of requestors in a computing system for use by one or more arbiters in the computing system to arbitrate between the plurality of requestors and a plurality of resources in a next cycle, the priority selection logic comprising: priority generation logic for each resource that is configured to generate priority information for the next cycle based on an arbitration scheme, the priority information indicating which of the plurality of requestors has priority in the next cycle; modification logic for each resource that is configured to generate relevant priority information for the next cycle based on the priority information for the next cycle for that resource, the relevant priority information for a resource being the priority information that relates to requestors that requested access to the resource in the current cycle and were not granted access to the resource in the current cycle; and combination logic configured to combine the relevant priority information for each resource to generate the common priority information for the next cycle.

The arbiters, arbiter systems and logic blocks described herein may be embodied in hardware on an integrated circuit. There may be provided a method of manufacturing, at an integrated circuit manufacturing system, the arbiters, arbiter systems and/or logic blocks described herein. There may be provided an integrated circuit definition dataset that, when processed in an integrated circuit manufacturing system, configures the system to manufacture the arbiter, arbiter system, and/or any of the logic blocks described herein. There may be provided a non-transitory computer readable storage medium having stored thereon a computer readable description of the arbiter, arbiter system, and/or any of the logic blocks described herein that, when processed in an integrated circuit manufacturing system, causes the integrated circuit manufacturing system to manufacture an integrated circuit embodying an arbiter, arbiter system or a logic block described herein.

There may be provided an integrated circuit manufacturing system comprising: a non-transitory computer readable storage medium having stored thereon a computer readable description of the arbiter, arbiter system or logic block described herein; a layout processing system configured to process the computer readable description so as to generate a circuit layout description of an integrated circuit embodying the arbiter, arbiter system, or logic block; and an integrated circuit generation system configured to manufacture the arbiter, arbiter system, or logic block according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 19 is a schematic diagram illustrating generating common priority information for an example scenario;

Figure 1:
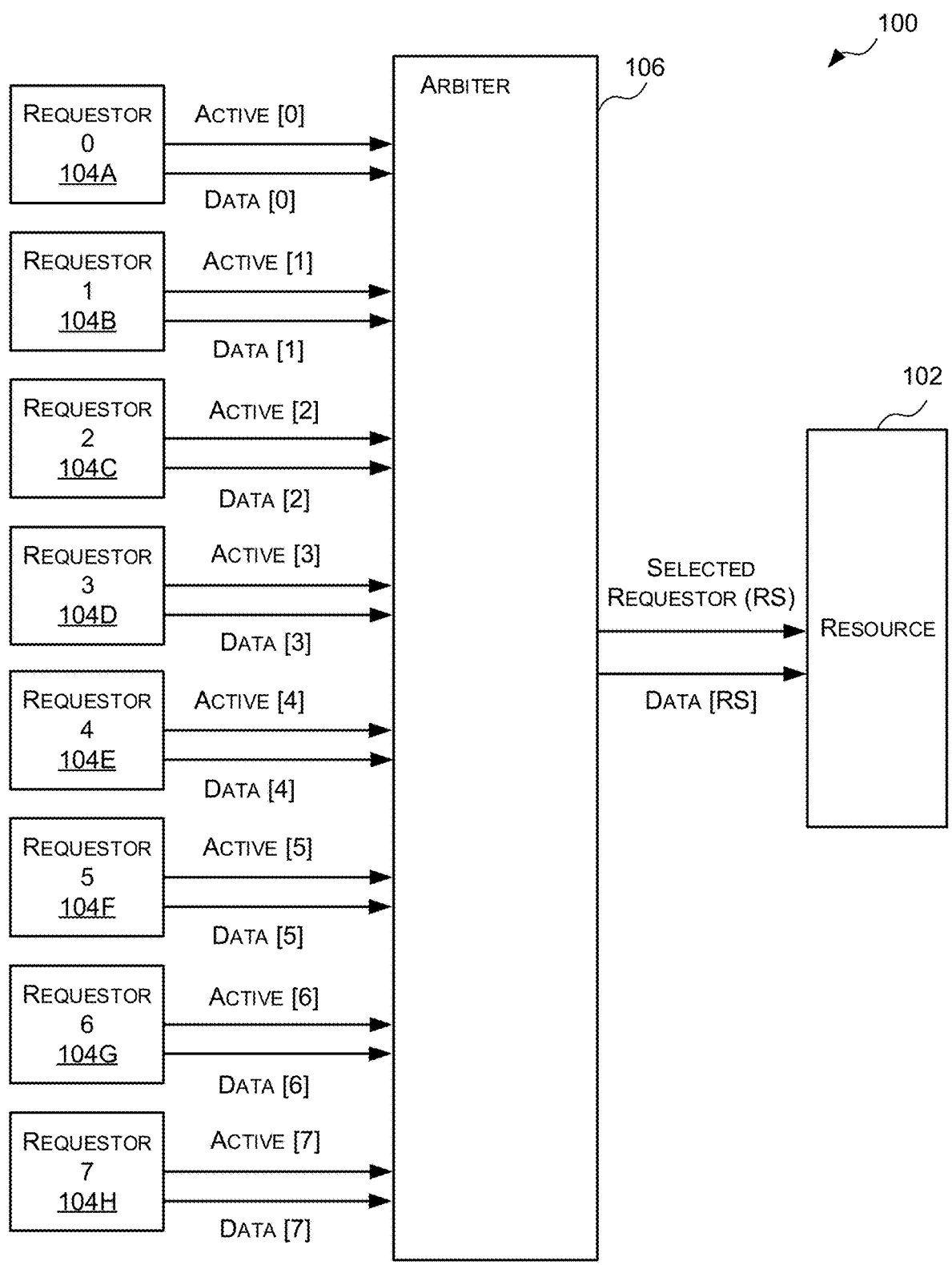
FIG. 1 is a block diagram of an example system comprising an arbiter that controls access to a shared resource.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Described herein are arbitration schemes for arbitrating between a plurality of requestors that share a common resource, and arbiters that implement such an arbitration scheme. The requestors are ordered and each cycle each requestor is allocated priority (or high priority) or not. According to the described arbitration schemes the requestor that is granted access to the resource is the lowest ordered requestor that has requested access to the resource in the cycle and has been allocated priority. If there are no requestors that have requested access in the cycle and have been allocated priority, the requestor that is granted access to the resource is the highest ordered requestor that has requested access to the resource. As described in more detail below, such an arbitration scheme can be implemented more efficiently in hardware (e.g. in terms of the number of logic gates) compared to other arbitration schemes, such as a round robin arbitration scheme.

The term 'cycle' is used herein to mean a processing cycle of the resource. The processing cycle of the resource may be, but is not limited to being, a clock cycle.

As described above, many computer systems comprise one or more shared resources which can receive more requests in a particular cycle than can be processed by the resource in that cycle. For example, FIG. 1 shows an example computer system 100 that comprises a resource 102 shared by a plurality of requestors 104A-H. The resource 102 may be, for example, but is not limited to, a shared memory, a networking switch fabric, a specialised state machine, or a complex computation element or the like. In any cycle none, one, or more than one of the plurality of requestors 104A-H may request access to the resource 102. In the example shown in FIG. 1, requestor i (Ri) makes a request to access the resource 102 by pulling signal Active[i] high. However, this is an example only and the requestors may make a request in another manner. When a requestor has requested access to the resource in a cycle the requestor is said to be active or valid in that cycle. There may be data associated with the requests which is to be processed by the resource 102. The data associated with requestor i is denoted Data[i].

Since the resource 102 can only process one request per cycle an arbiter 106 arbitrates between the requestors. Specifically, the arbiter 106 receives the requests from the requestors and each cycle selects one of the active requestors to be granted access to the resource 102. The arbiter 106 then provides information to the resource identifying the selected requestor (RS) (e.g. a requestor ID or number) and any data (Data[RS]) associated with the selected requestor.

Figure 2:
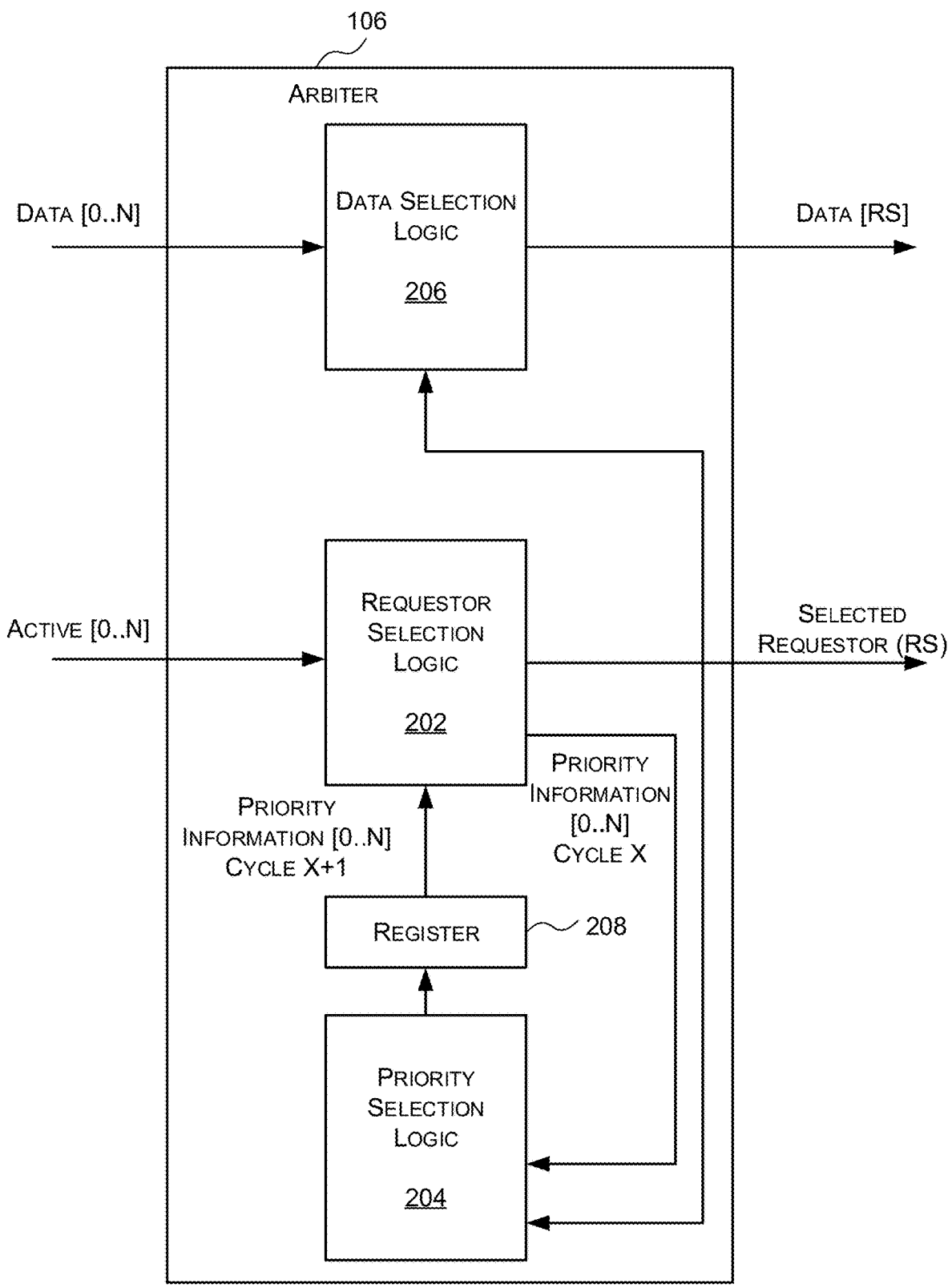
FIG. 2 is a schematic diagram of an example arbiter of FIG. 1 comprising requestor selection logic.

Reference is now made to FIG. 2 which illustrates an example arbiter 106. In this example the arbiter 106 comprises requestor selection logic 202 that is configured to select a requestor 104A-H that is to be granted access to the resource 102 in the current cycle in accordance with an arbitration scheme. Each cycle the requestor selection logic 202 receives active information indicating which requestors have requested access to the resource 102 in the current cycle, and priority information indicating which requestors have priority (or high priority) in the current cycle. The requestor selection logic 202 selects one of the active requestors in the current cycle to be granted access to the resource based on the active information, the priority information and the arbitration scheme implemented by the arbiter 106. The arbiter 106 may also comprise data selection logic 206 which is configured to receive information identifying the selected requestor and select and forward the data associated with the selected requestor to the resource 102. The data selection logic 206 may be implemented as a multiplexor.

The active information may be implemented as an active mask or vector that comprises one bit for each requestor that indicates whether that requestor has requested access to the resource in the current cycle. For example, the $i^{th}$ bit of the active mask may indicate whether the $i^{th}$ requestor, according to a predetermined ordering of the requestors, has requested access to the resource in the current cycle. Any criteria may be used to order the requestors. For example, the requestors may be ordered in numerical order or in any other suitable order. In some cases, a '1' may indicate that the corresponding requestor has requested access to the resource and a '0' may indicate that the corresponding requestor has not requested access to the resource. However, it will be evident that this is an example only and that in other cases a '0' may indicate that the corresponding requestor has requested access to the resource and a '1' may indicate that the corresponding requestor has not requested access to the resource.

Figure 3:
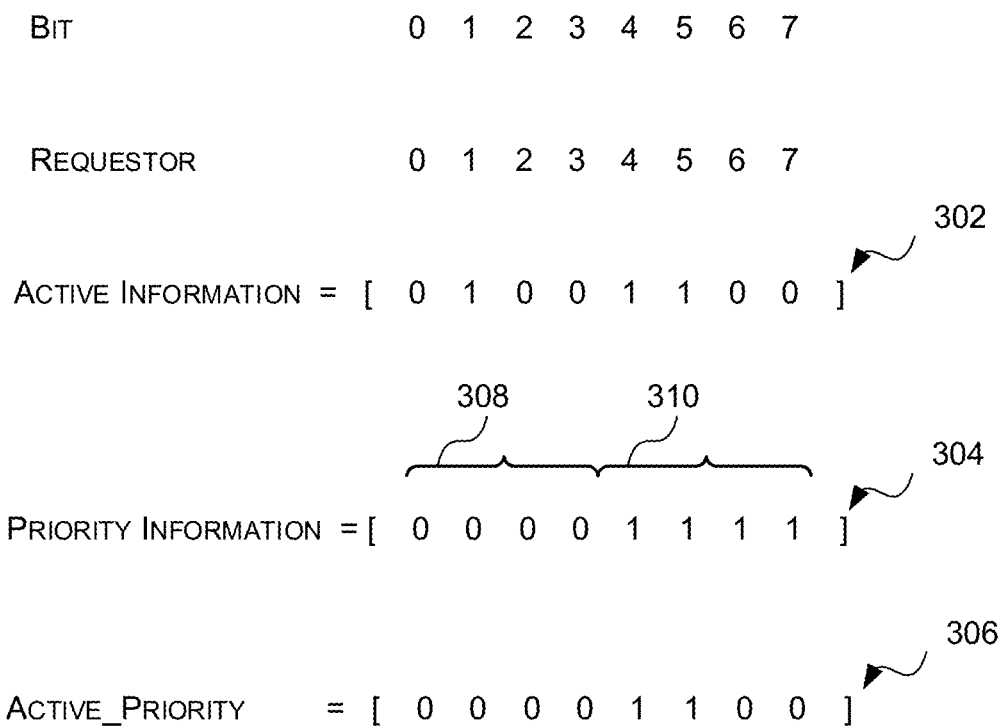
FIG. 3 is a schematic diagram of example information that may be received by and/or generated by the requestor selection logic of FIG. 2.

Reference is now made to FIG. 3 which illustrates example active information 302 where there are eight requestors numbered from 0 to 7 and the requestors are ordered in numerical order. In this example, the active information 302 comprises eight bits where the $i^{th}$ bit of the active information 302 corresponds to requestor i (Ri). Specifically, bit 0 corresponds to requestor 0, bit 1 corresponds to requestors 1, bit 2 corresponds to requestor 2 etc. In this example a '1' indicates that the corresponding requestor has requested access therefore the example active information 302 of [0 1 0 0 1 1 0 0] indicates that requestors 1, 4 and 5 are active (i.e. have requested access to the resource in the current cycle).

Similarly, the priority information may be implemented as a priority mask that comprises one bit for each requestor that indicates whether that requestor has priority or not. Specifically, the $i^{th}$ bit of the priority mask may indicate whether the $i^{th}$ requestor, according to a predetermined ordering of the requestors, has priority in the current cycle. Preferably the same ordering of the requestors is used for both the active information and the priority information such that the $i^{th}$ bit of the active mask and the $i^{th}$ bit of the priority mask correspond to the same requestor. In some cases, a '1' may indicate that the corresponding requestor has priority (or has high priority) and a '0' may indicate that the corresponding requestor does not have priority (or has low priority). However, it will be evident to a person of skill in the art that this is an example only and that in other cases a '0' may indicate that the corresponding requestor has priority (or has high priority) and a '1' may indicate that the corresponding requestor does not have priority (or has low priority). As described in more detail below, the priority information for each cycle may be dynamically determined in accordance with the arbitration scheme by priority selection logic 204 which may form part of the arbiter 106 as shown in FIG. 2 or may be external to the arbiter 106. The priority selection logic 204 may be configured to store the priority information generated in a cycle in a storage unit, such as a register 208.

Reference is again made to FIG. 3 which illustrates example priority information 304 where there are eight requestors numbered from 0 to 7 and the requestors are ordered in numerical order. Like the active information 302 shown in FIG. 3, the priority information 304 comprises eight bits where the $i^{th}$ bit of the priority information 304 corresponds to requestor i (Ri). In this example a '1' indicates that the corresponding requestor has priority (or high priority) therefore the example priority information 304 of [0 0 0 0 1 1 1 1] indicates that requestors 4, 5, 6 and 7 have priority (or have high priority).

In some cases, the requestor selection logic 202 may be configured to generate active_priority information from the active information 302 and the priority information 304 that indicates which of the requestors are both active and have priority in the current cycle. As described in more detail below, this may aid the requestor selection logic 202 in selecting the requestor to be granted access more quickly and efficiently. Like the active information and the priority information the active_priority information may be implemented as a mask that has a bit for each requestor that indicates whether that requestor is both active and has priority (or high priority). Where the active information is in the form of an active mask and the priority information is in the form of a priority mask, the active_priority information may be generated by performing a bit-wise AND of the active mask and the priority mask.

Reference is again made to FIG. 3 which illustrates example active_priority information 306 where there are eight requestors numbered from 0 to 7 and the requestors are ordered in numerical order. The active_priority information 306 comprises eight bits where the $i^{th}$ bit of the active_priority information 306 corresponds to requestor i (Ri). Since the active information and the priority information indicate that only requestors 4 and 5 are both active and have priority the active_priority information only has bits 4 and 5 set to a '1'.

An arbitration scheme is a rule or a set of rules that define the relative priority of requests received in a cycle. In other words, an arbitration scheme is a rule or set of rules which are used to determine which requestor is to be granted access to the resource in each cycle. In the examples described herein the arbitration schemes comprise one or more selection rules that define how a requestor is selected based on the priority information and one or more priority rules that define what priority information is used each cycle (or how the priority information is generated each cycle).

An example arbitration scheme is a round robin scheme. In a round-robin scheme the requestors are ordered (e.g. left to right, right to left etc.) from lowest to highest according to one or more criteria and in any cycle the lowest ordered active requestor with priority is granted access to the resource, and if there are no active requestors with priority, the lowest ordered active requestor is granted access to the resource. In the next cycle, all higher ordered requestors, relative to the requestor granted access in the current cycle, are given priority (or high priority) and the remainder of the requestors are not given priority (or are given low priority). Accordingly, the priority information for a round-robin scheme will comprise a contiguous block 310 of requestors with priority (or high priority) (which may also be referred to as the priority block or the priority region) and a contiguous block 308 of requestors without priority (or with low priority).

For example, where the requestors are ordered from left to right such that the leftmost requestor is the lowest ordered requestor and the rightmost requestor is the highest ordered requestor, in any cycle the leftmost active requestor that has priority is selected. If, however, there are no active requestors that have priority then the leftmost active requestor is selected. In this example, in the next cycle, all requestors to the right of the requestor granted access to the resource in the current cycle are given priority (or high priority) and the remainder of the requestors are not given priority (or are given low priority).

Figure 4:
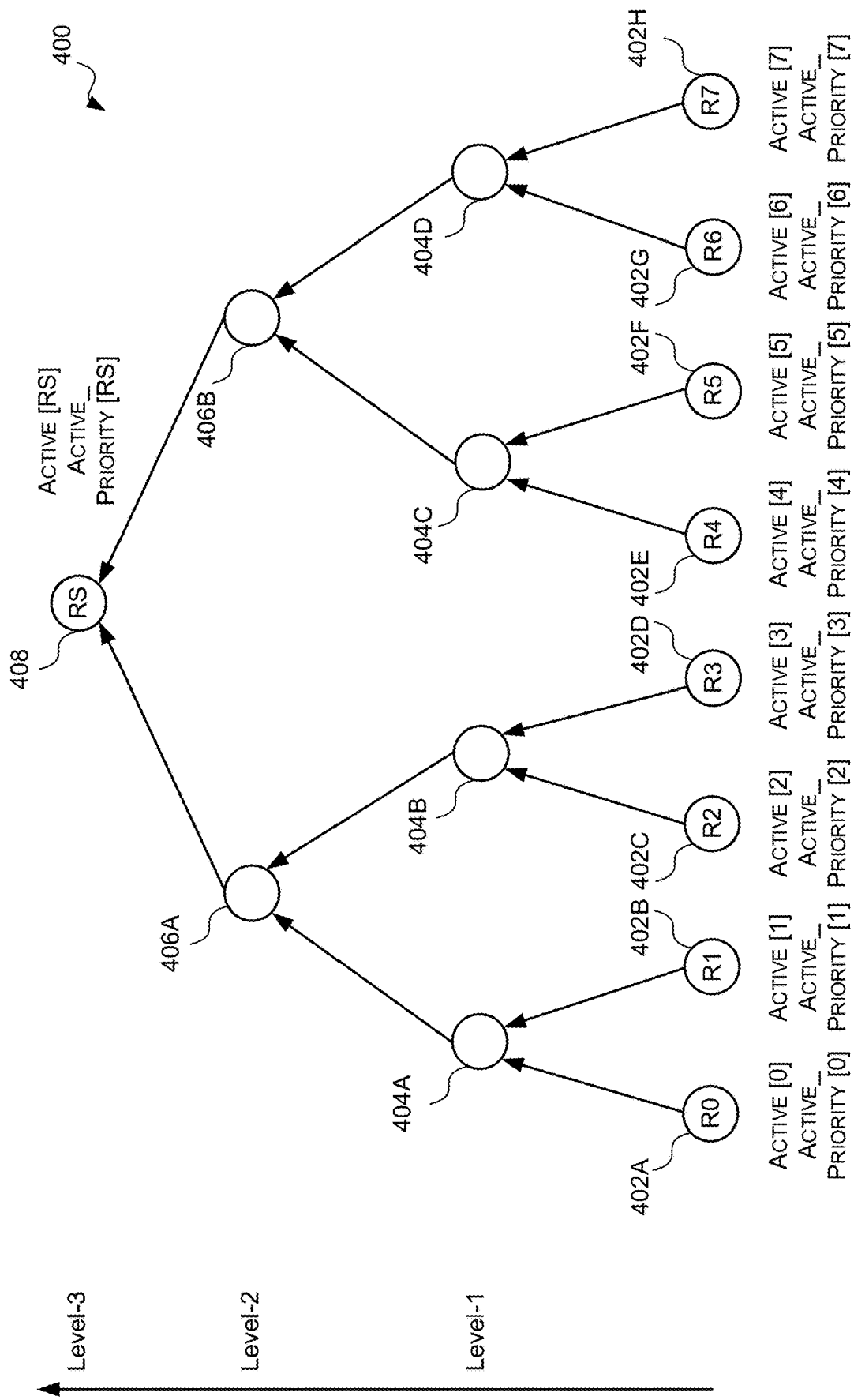
FIG. 4 is a schematic diagram of an example binary decision tree to select a requestor from a plurality of requestors.

Requestor selection logic 202 that is configured to select requestors in accordance with the described round robin scheme may be implemented as a binary decision tree. As shown in FIG. 4, a binary decision tree 400 is a structure that can be configured to select one element from a plurality of elements by comparing pairs of elements. A binary decision tree configured to select one element from a plurality of elements comprises a plurality of leaf nodes 402A-H that are connected to one or more layers of decision nodes 404A-D, 406A-B, 408. There are typically $\log_2(N)$ layers of decision nodes where N is the number of elements. For example, in the example of FIG. 4 where there are eight elements (i.e. eight requestors) there are three levels of decision nodes-level-1 decision nodes 404A-D, level-2 decision nodes 406A-B, and a level-3 decision node 408.

Each node is populated with data relating to one of the plurality of elements. Each leaf node 402A-H is initially populated with information about a different one of the plurality of elements and the decision nodes are populated based on the features of the elements and predetermined criteria such that the "best" element according to the predetermined criteria rises to the top of the tree (i.e. the top decision node 408). Specifically, each decision node 404A-D, 406A-B, 408 is connected to two nodes in the layer below (e.g. a left node and a right node), which may be referred to herein as child nodes, and is populated with the data of one of its child nodes according to one or more predetermined criteria. In particular, the level-1 decision nodes 404A-D are connected to two leaf nodes 402A-H and are populated with the data of one of the connected leaf nodes; the level-2 decision nodes 406A-B are connected to two level-1 decision nodes 404A-D and are populated with the data of one of the connected level-1 nodes; and, the level-3 decision node 408 is connected to two level-2 decision nodes and is populated with the data of one of the connected level-2 nodes.

To implement the round robin scheme described above using such a decision tree, each node 402A-H, 404A-D, 406A-B, 408 may be configured to hold information identifying a requestor (e.g. a requestor ID for requestor i), information indicating whether the identified requestor has requested access to the resource in the current cycle (e.g. active [i]), and information indicating whether the identified requestor has requested access and has priority in the current cycle (e.g. active_priority [i]). Each cycle the leaf nodes 402A-H are populated with information corresponding to the requestors in the same order used for the active information and the priority information. The decision nodes 404A-D, 406A-B and 408 are then configured to select the "best" requestor according to the scheme. For example, where the requestors are ordered from left to right such that the leftmost requestor is the lowest ordered requestor and the rightmost requestor is the highest ordered requestor each decision node is configured to select which child to be populated by according to the following rule:

$$\text{current node} = \begin{cases} \text{left child node,} & \text{if left.active\_priority} \lor \\ & (\text{left.active} \land \overline{\text{right.active\_priority}}) \\ \text{right child node,} & \text{otherwise} \end{cases}$$

where left.active_priority is set if the left child node relates to an active requestor with priority, left.active is set if the left child node relates to an active requestor, and $\overline{\text{right.active\_priority}}$ is set if the right child node relates to a requestor that is not active with priority.

In other words, each decision node is populated with the left child node if the left child node is populated with a requestor that is active and has priority, or, if the left child node is populated with a requestor that is active and the right child node is not populated with a requestor that is active and has priority. Otherwise the decision node is populated with the right child node. In this manner the decision tree will select the leftmost requestor that is active and has priority, or if no such requestor exists, it will select the leftmost requestor that is active.

Figure 5:
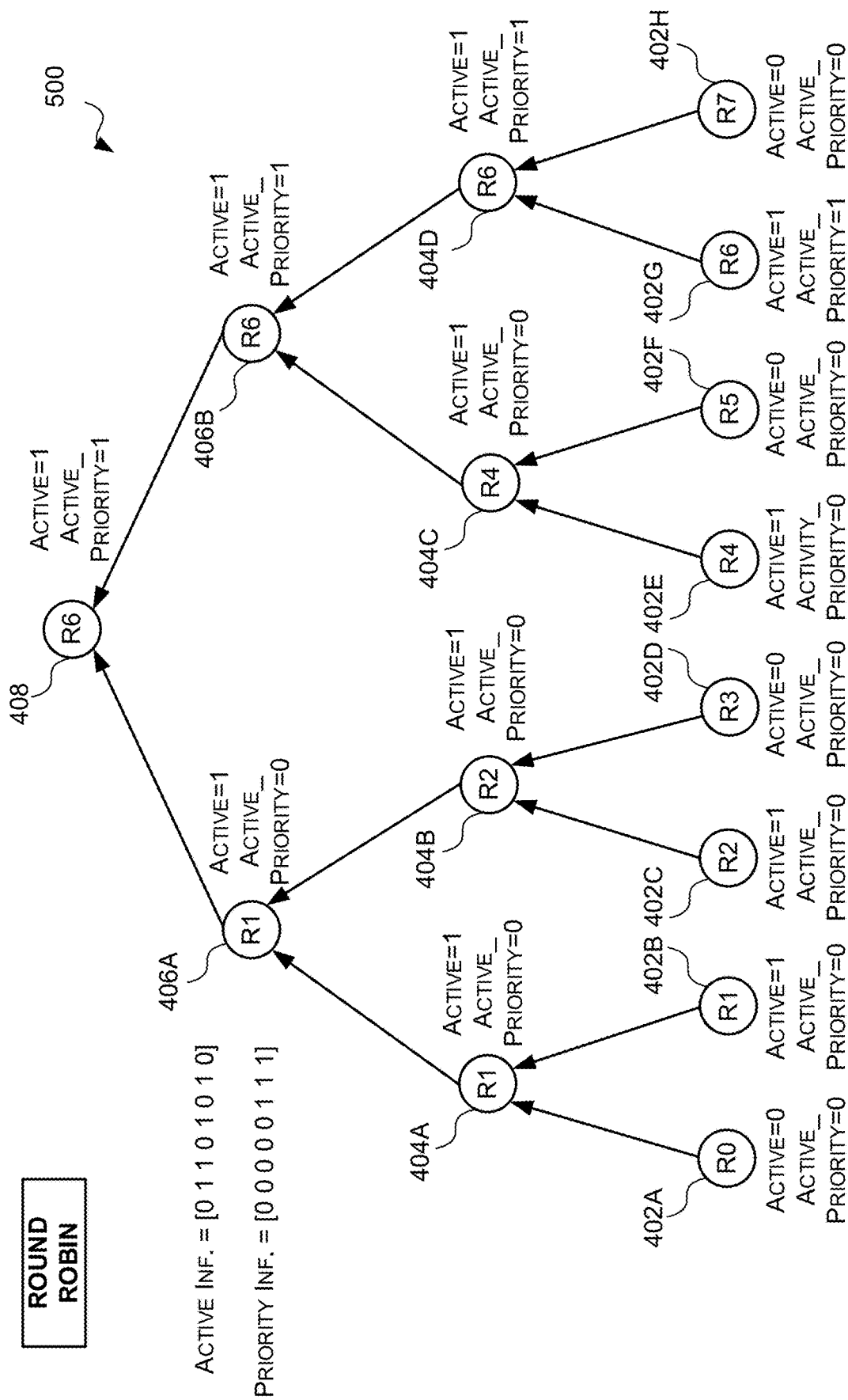
FIG. 5 is a schematic diagram of the binary decision tree of FIG. 4 configured to implement a round robin scheme for a first example set of requestor data.

An example of the operation of such a decision tree is illustrated in FIG. 5. In this example decision tree 500, there are eight requestors numbered from 0 to 7 wherein Ri is used to denote the $i^{th}$ requestor, the priority mask is [0 0 0 0 0 1 1 1] indicating that requestors 5, 6 and 7 (R5, R6, and R7) have priority in the current cycle, and the active mask is [0 1 1 0 1 0 1 0] indicating that requestors 1, 2, 4 and 6 (R1, R2, R4 and R6) are active (e.g. have requested access to the resource) in the current cycle. These priority and active masks result in an active_priority mask of [0 0 0 0 0 1 0] indicating that only requestor 6 (R6) is active and has priority in the current cycle. Based on the round robin scheme described above this means that requestor 6 should be selected as the requestor which is granted access to the resource. It can be seen from FIG. 5 that this is indeed what happens.

The leaf nodes 402A-H are populated with requestors 0-7 respectively. The level-1 decision nodes 404A-D are populated with requestors 1, 2, 4 and 6 respectively since requestor 1 is active and requestor 0 is not; requestor 2 is active and requestor 3 is not; requestor 4 is active and requestor 5 is not; and requestor 6 is active with priority and requestor 7 is not active. The level-2 decision nodes 406A-B are populated with requestors 1 and 6 respectively as requestor 1 is the leftmost active requestor, and requestor 6 is active and has priority and requestor 4 does not have priority. The level-3 decision node 408 is populated with requestor 6 as requestor 6 is active and has priority and requestor 1 does not have priority.

The described binary decision tree to implement a round robin arbitration scheme requires two logic gates per decision node to control the selection. For example, there may be a first logic gate to determine left.active∧$\overline{\text{right.activepriority}}$ (i.e. a single logic gate can perform the AND and the NOT) and a second logic gate to determine left.activepriority∨output of first logic gate (i.e. a single logic gate can perform the OR). Since the binary decision tree will have $\lceil \log_2(N) \rceil$ layers of decision nodes, the critical path will include roughly $2\lceil \log_2(N) \rceil$ logic gates. The inventor has identified, however, that the control logic may be simplified, without affecting the fairness of the arbitration, by implementing an arbitration scheme that comprises modified selection rules that specify that, instead of the lowest ordered active requestor being selected when there are no active requestors with priority, the highest ordered active requestor is selected when there are no active requestors with priority. In other words, the modified selection rules specify that the lowest ordered active requestor with priority is selected, or if there are no active requestors with priority then the highest ordered active requestor is selected.

This means that where the requestors are ordered from left to right such that the leftmost requestor is the lowest ordered requestor and the rightmost requestor is the highest ordered requestor, the leftmost active requestor with priority is selected, or if there are no active requestors with priority then the rightmost active requestor is selected.

Figure 6:
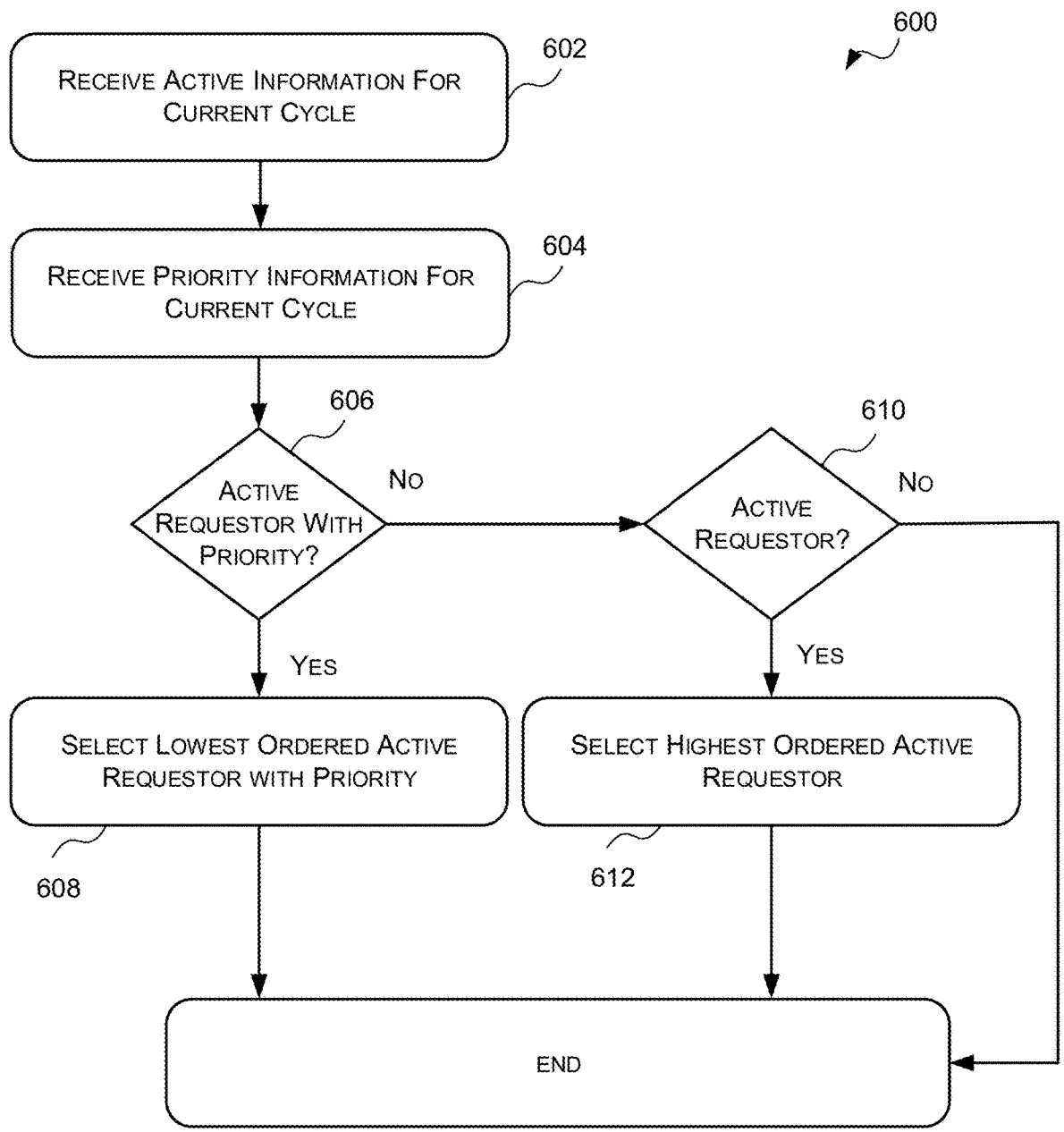
FIG. 6 is a flow diagram of an exemplary method for selecting a requestor from a plurality of requestors based on the priority allocated to the requestors.

Reference is now made to FIG. 6 which illustrates an example method 600, which may be executed by the requestor selection logic 202 of FIG. 2, for selecting a requestor in accordance with the modified selection rules. The method 600 begins at blocks 602 and 604 where the requestor selection logic receives active information and priority information for the current cycle respectively. Although in the example method 600 of FIG. 6 the active information and the priority information are received sequentially, in other example methods the priority information may be received before the active information, or the priority information and the active information may be received concurrently or in parallel. Once the active information and the priority information have been received the method 600 proceeds to block 606.

At block 606, the requestor selection logic 202 determines from the active information and the priority information whether there are any active requestors with priority (or high priority) in the current cycle. In some cases, this may comprise generating an active_priority mask based on the active information and the priority information, and determining whether there are any active requestors with priority (or high priority) based on whether the active_priority mask has any '1's. For example, if the active_priority mask does not have any '1's then the requestor selection logic 202 may determine that there are no active requestors with priority. Conversely, if the active_priority mask does have at least one '1' then the requestor selection logic 202 may determine that there is at least one active requestor with priority. If the requestor selection logic 202 determines that there is at least one requestor with priority in the current cycle, then the method 600 proceeds to block 608. If, however, the requestor selection logic 202 determines that there are no active requestors with priority in the current cycle then the method 600 proceeds to block 610.

At block 608, after the requestor selection logic 202 has determined that there is at least one active requestor with priority (or high priority), the requestor selection logic 202 selects the lowest ordered active requestor with priority (or high priority) as the requestor to be granted access to the resource. Where the requestors are ordered from left to right such that the leftmost requestor is the lowest ordered requestor and the rightmost requestor is the highest ordered requestor then the leftmost active requestor with priority will be selected. Once the lowest ordered active requestor with priority has been selected the method 600 ends.

At block 610, after the requestor selection logic 202 has determined that there are no active requestors with priority (or high priority), the requestor selection logic 202 determines from the active information whether there are any active requestors. Where the active information is implemented by an active mask the requestor selection logic 202 may determine whether there are any active requestors based on whether the active mask has any '1's. For example, if the active mask does not have any 1's then the requestor selection logic 202 may determine that there are no active requestors in the current cycle. Conversely, if the active mask has at least one '1' then the requestor selection logic 202 may determine that there is at least one active requestor in the current cycle. If the requestor selection logic 202 determines that there is at least one active requestor in the current cycle, then the method 600 proceeds to block 612. If, however, the requestor selection logic 202 determines that there are no active requestors then no request is selected and the method 600 ends.

At block 612, after the requestor selection logic 202 has determined that there are no active requestors with priority (or high priority), but there is at least one active requestor the requestor selection logic 202 selects the highest ordered active requestor as the requestor to be granted access to the resource. Where the requestors are ordered from left to right such that the leftmost requestor is the lowest ordered requestor and the rightmost requestor is the highest ordered requestor then the rightmost active requestor is selected. Once the highest ordered active requestor has been selected the method 600 ends.

The modified selection rules described above (and implemented by the method 600 of FIG. 6) may be implemented using a decision tree, such as the decision tree 400 described above with respect to FIG. 4. Except, instead of the decision nodes 404A-D, 406A-B, 408 selecting which child node to be populated by according to the rule described above, when the leaf nodes are populated with the requestors in order from left to right the decision nodes may be configured to select which child to be populated by according to the following rule:

$$\text{current node} = \begin{cases} \text{left child node,} & \text{if left.active\_priority} \vee \overline{\text{right.active}} \\ \text{right child node,} & \text{otherwise} \end{cases}$$

where left.active_priority is set if the left child node is populated with an active requestor with priority, and $\overline{\text{right.active}}$ is set if the right child node is populated with a requestor that is not active.

Since the leaf nodes will be populated by the requestors in order (either left to right, or right to left) each decision node will have a child node that is populated with information corresponding to a higher ordered requestor (which may be referred to as the high child node) and a child node that is populated with information corresponding to a lower ordered requestor (which may be referred to as the low child node). When the leaf nodes are populated with the requestors in order from left to right the left child node is the low child node and the right child node is the high child node. If, however, the leaf nodes are populated with the requestors in order from right to left, the left child node is the high child node and the right child node is the low child node. Accordingly, the rule implemented by the decision nodes may be generalized as:

$$\text{current node} = \begin{cases} \text{low child node,} & \text{if low.active\_priority} \vee \overline{\text{high.active}} \\ \text{high child node,} & \text{otherwise} \end{cases}$$

Figure 7:
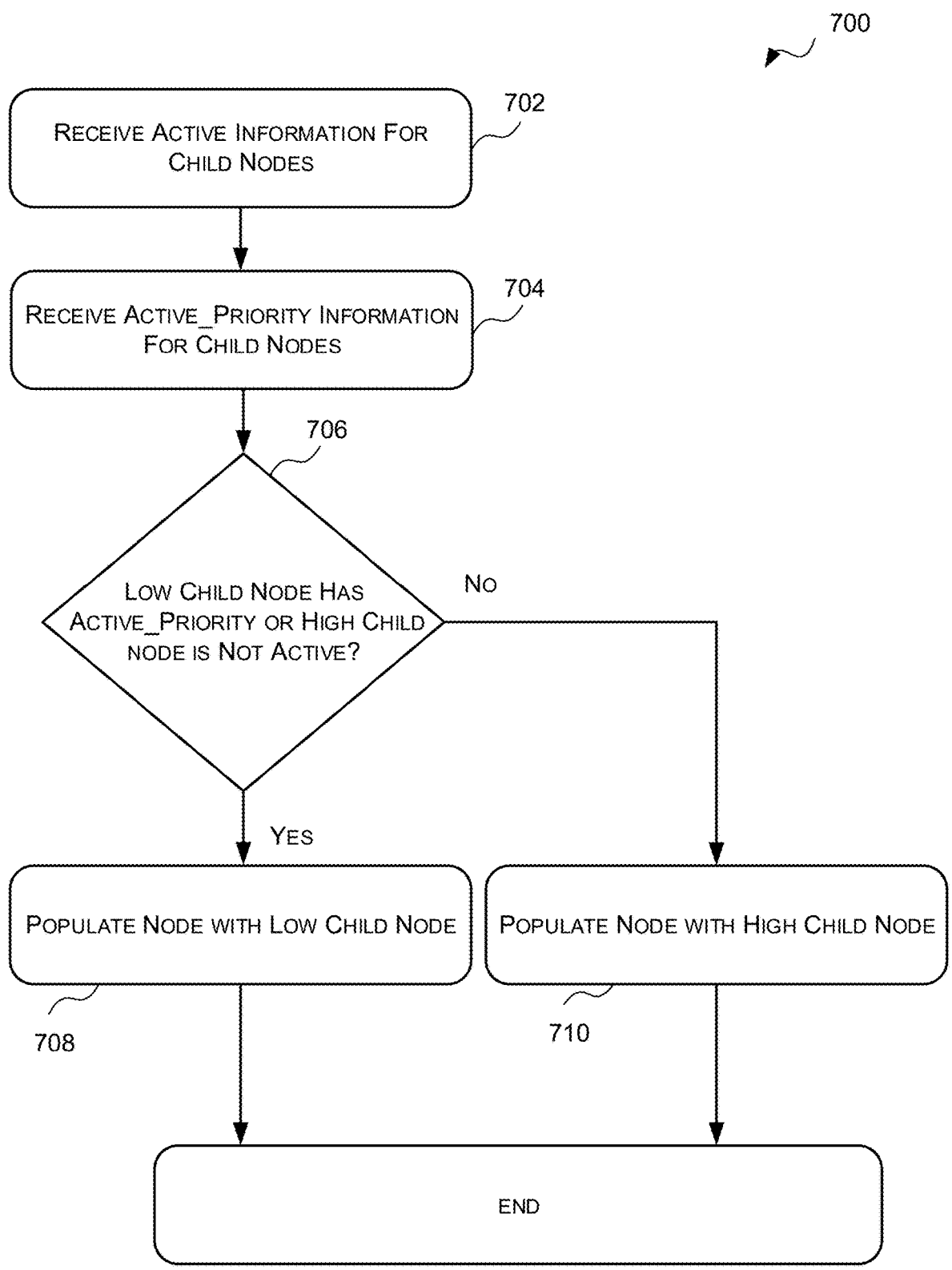
FIG. 7 is a flow diagram of an exemplary method for populating a decision node of a binary decision tree configured to implement the method of FIG. 6.

This generalized rule which is implemented at each decision node is summarized in FIG. 7 via method 700. Specifically, at block 702 the decision node receives the active information for the child nodes, at block 704 the decision node receives active_priority information for the child nodes. At block 706 the decision node determines from the active information and the active_priority information if the low node has active_priority or the high node is not active. If either of these conditions are satisfied, then the decision node is populated with the information from the low child node (block 708). Otherwise the decision node is populated with the information from the high child node (block 710).

Configuring the decision nodes to use the modified selection rules as opposed to the rules set out above for the round robin scheme allows the number of logic gates per decision node to be reduced from two to one. This is because the selection condition left.active_priority $\vee$ $\overline{\text{right.active}}$ can be determined with a single logic gate since the "NOT" function can be merged with the "OR" function. Reducing the number of gates per decision node reduces the total number of gates in the requestor selection logic 202 which may reduce the area to implement the requestor selection logic 202. Reducing the number of gates per decision node also reduces the number of logic gates in the critical path which may significantly reduce the amount of time for the requestor selection logic 202 to produce a result (i.e. make a selection). Specifically, as described above, in the round robin binary decision tree implementation there are two gates per decision node and thus $2\lceil \log_2(N) \rceil$ logic gates in the critical path. By only having one logic gate per decision node the number of logic gates in the critical path is reduced to $\lceil \log_2(N) \rceil$ which may significantly improve the timing of the requestor selection logic 202.

In some cases, selecting a requestor in accordance with the modified selection rules may result in the same requestor being selected relative to the round robin scheme. Specifically, where there is at least one active requestor with priority both the round robin scheme and the modified selection rules will select the same requestor—the lowest ordered active requestor with priority. For example, FIG. 8 illustrate an example of a binary decision tree 800 which is the same as the decision tree 400 of FIG. 4—it comprises eight leaf nodes 802A-H, four level-1 decision nodes 804A-D, two level-2 decision nodes 806A-B and one level-3 decision node or top decision node 808—except the decision nodes 804A-D, 806A-B, 808 are configured in accordance with the modified selection rule.

Figure 8:
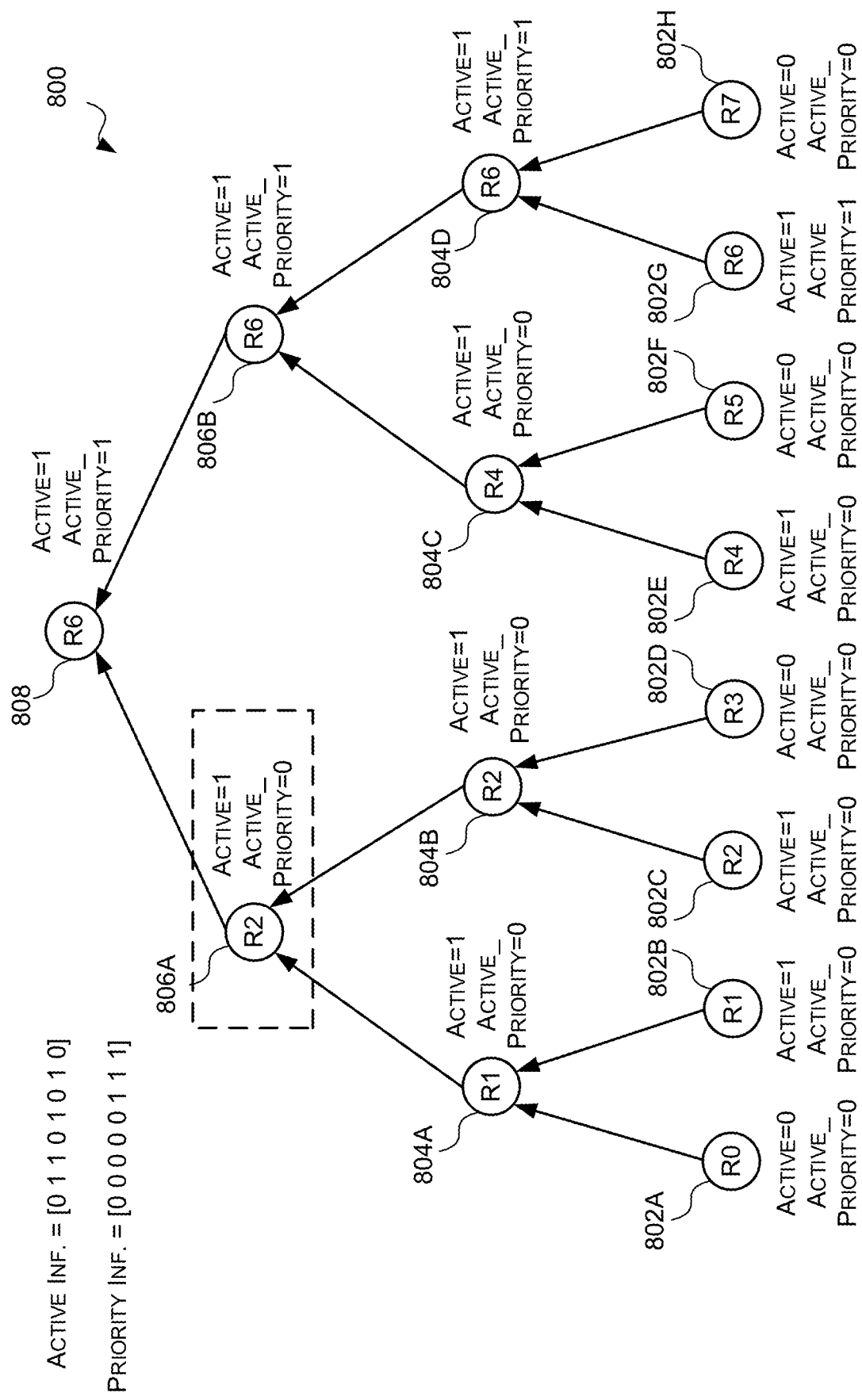
FIG. 8 is a schematic diagram of a binary decision tree configured to implement the requestor selection method of FIG. 6 for the first example set of requestor data.

In FIG. 8 the decision tree 800 is provided with the same inputs as the example shown in FIG. 5—specifically there are eight requestors numbered from 0 to 7 wherein Ri is used to denote the $i^{th}$ requestor, the priority mask is [0 0 0 0 0 1 1 1] indicating that requestors 5, 6 and 7 (R5, R6, and R7) have priority in the current cycle, and the active mask is [0 1 1 0 1 0 1 0] indicating that requestors 1, 2, 4 and 6 (R1, R2, R4 and R6) are active (e.g. have requested access to the resource) in the current cycle.

As with the example of FIG. 5, the leaf nodes 802A-H are populated with requestors 0 to 7 respectively. In this example the level-1 decision nodes 804A-D are populated with requestors 1, 2, 4 and 6 respectively because requestor 1 is active and requestor 0 is not; requestor 2 is active and requestor 3 is not; requestor 4 is active and requestor 5 is not; and requestor 6 is active with priority and requestor 7 is not active. The level-2 decision nodes 806A-B are populated with requestors 2 and 6 respectively as requestor 2 is the highest ordered active requestor, and requestor 6 is active and has priority and requestor 4 does not have priority. The level-3 decision node 808 is populated with requestor 6 as requestor 6 is active and has priority and requestor 2 does not have priority.

It can be seen that, although not all the decision nodes of FIG. 8 are populated with the same requestors as the decision nodes in the round-robin binary decision tree shown in FIG. 5 (e.g. decision node 806A of FIG. 8 is populated with a different requestor than decision node 406A of FIG. 5), the result is the same—requestor 6 is selected. Both the round robin scheme and the modified arbitration scheme will also select the same requestor when there are no active requestors with priority and only one active requestor without priority. Specifically, they will both select the active requestor without priority.

Figure 9:
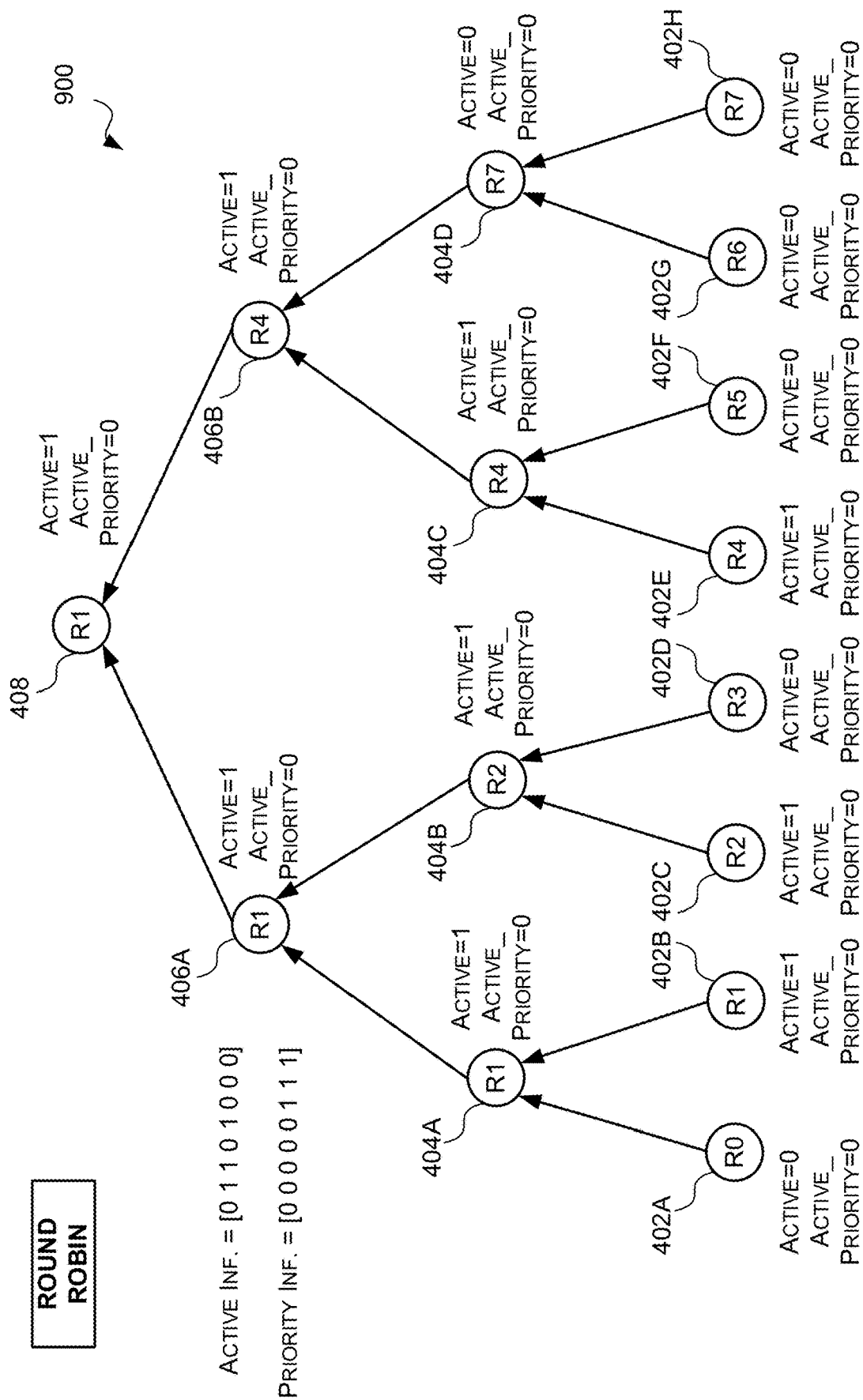
FIG. 9 is a schematic diagram of the binary decision tree of FIG. 4 configured to implement a round robin scheme for a second example set of requestor data.
Figure 10:
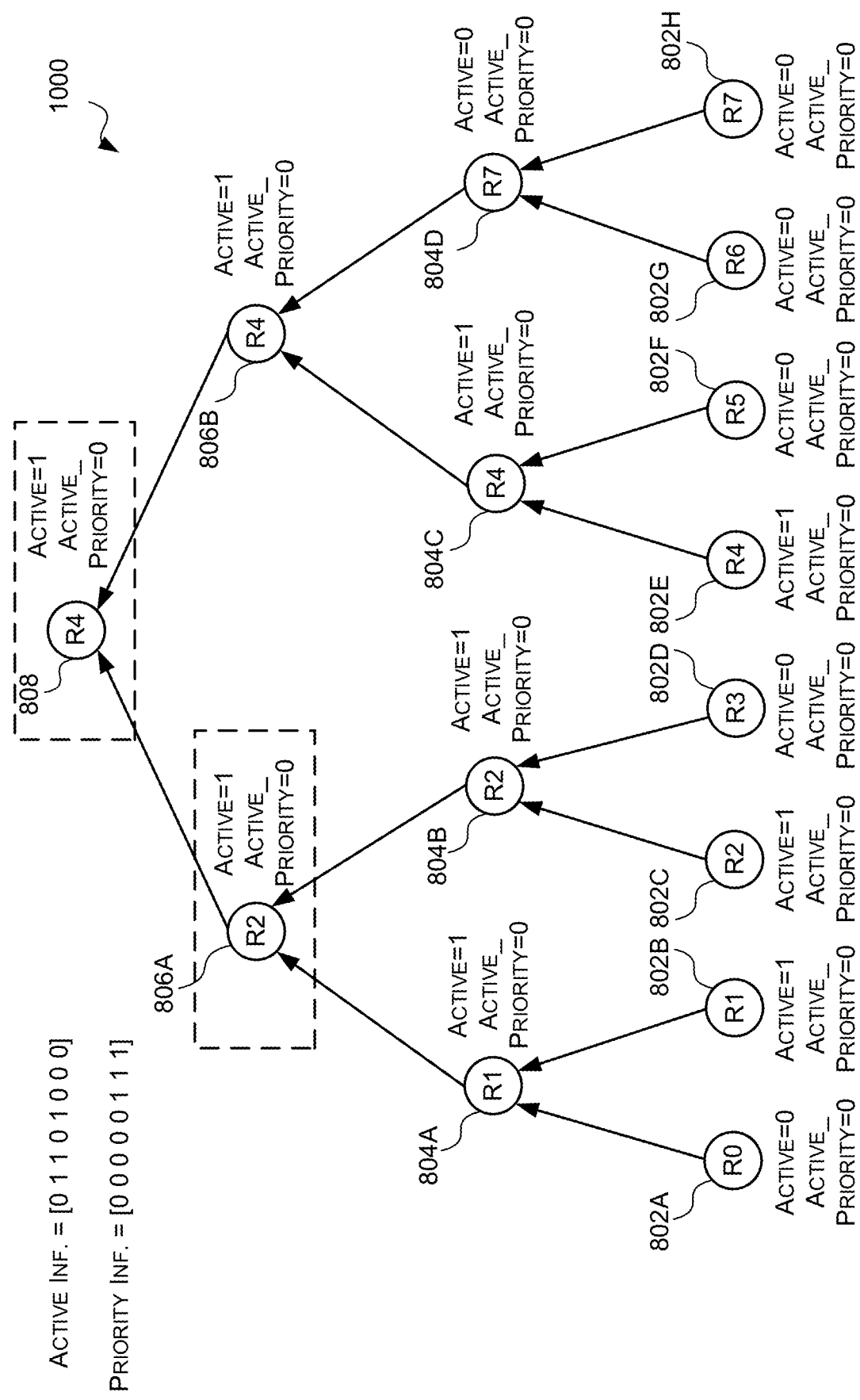
FIG. 10 is a schematic diagram of the binary decision tree of FIG. 8 configured to implement the requestor selection method of FIG. 6 for the second example set of requestor data.

However, in other cases, using the modified selection rules may result in a different requestor being selected relative to the round robin scheme. For example, where there are no active requestors with priority and there are two or more active requestors without priority, the round robin scheme and the modified selection rules will select different requestors. The round robin scheme will select the lowest ordered active requestor without priority and the modified selection rules will select the highest ordered active requestor without priority. This is illustrated in FIGS. 9 and 10 which show binary decision trees 900, 1000 that implement a round robin scheme and the modified selection rules respectively. In both cases there are eight requestors numbered from 0 to 7 wherein Ri is used to denote the $i^{th}$ requestor, the priority mask is [0 0 0 0 0 1 1 1] indicating that requestors 5, 6 and 7 (R5, R6, and R7) have priority in the current cycle, and the active mask is [0 1 1 0 1 0 0 0] indicating that requestors 1, 2, and 4 (R1, R2, R4) are active (e.g. have requested access to the resource) in the current cycle.

In FIG. 9 the leaf nodes 402A-H are populated with requestors 0 to 7 respectively. In this example the level-1 decision nodes 404A-D are populated with requestors 1, 2, 4 and 7 respectively because requestor 1 is active and requestor 0 is not; requestor 2 is active and requestor 3 is not; requestor 4 is active and requestor 5 is not; and neither requestor 6 or 7 is active or has priority and requestor 7 is the highest ordered requestor. The level-2 decision nodes 406A-B are populated with requestors 1 and 4 respectively as requestor 2 is the lowest ordered active requestor, and requestor 4 is active and requestor 7 is not. The level-3 decision node 408 is populated with requestor 1 as requestor 1 is the lowest ordered active requestor.

In FIG. 10 the leaf nodes 802A-H are populated with requestors 0 to 7 respectively. In this example, the level-1 decision nodes 804A-D are populated with requestors 1, 2, 4 and 7 respectively because requestor 1 is active and requestor 0 is not; requestor 2 is active and requestor 3 is not; requestor 4 is active and requestor 5 is not; and neither requestor 6 or 7 is active or has priority and requestor 7 is the highest ordered requestor. The level-2 decision nodes 806A-B are populated with requestors 2 and 4 respectively as requestor 2 is the highest ordered active requestor, and requestor 4 is active and requestor 7 is not. The level-3 decision node 808 is populated with requestor 4 as requestor 4 is the highest ordered active requestor.

It can be seen from FIG. 9 that in the round robin scheme requestor 1 (R1) is selected as this is the lowest ordered active requestor, and it can be seen from FIG. 10 that using the modified selection rules requestor 4 (R4) is selected as this is the highest ordered active requestor. Despite the fact that the modified selection rules will not result in the exact same requestor being selected as in the round robin scheme, testing has shown that the two schemes can achieve a similar level of fairness.

As described above, each cycle the requestor selection logic 202 receives priority information to be used in that cycle. The priority information for each cycle may be generated by priority selection logic 204 in accordance with the priority rules of the arbitration scheme. The priority selection logic 204 may be part of the arbiter 106 as shown in FIG. 2 or it may be external to the arbiter and in communication with the requestor selection logic 202. In the round-robin scheme described above, the priority selection logic 204 is configured to generate the priority information for the next cycle based solely on the selected requestor of the current cycle. Specifically, in the round robin scheme described above, the priority selection logic 204 is configured to generate priority information for the next cycle such that all higher ordered requestors relative to the requestor selected in the current cycle have priority (or high priority) and the remaining requestors (i.e. the selected requestor and all lower ordered requestors) do not have priority (or have low priority). However, if the priority information is generated in this manner when the modified selection rules are used it may be possible to reach a situation where the lowest ordered requestors are not gaining access to the resource.

Accordingly, in the embodiments described herein the priority information may be generated based on at least the priority information used in the current cycle. Four example methods for generating the priority information for the next cycle based on the priority information used in the current cycle are described below in reference to FIGS. 11-14, however, it will be evident to a person of skill in the art that these are examples only and the priority information for the next cycle may be generated based on the priority information used in the current cycle in any suitable manner.

Figure 11:
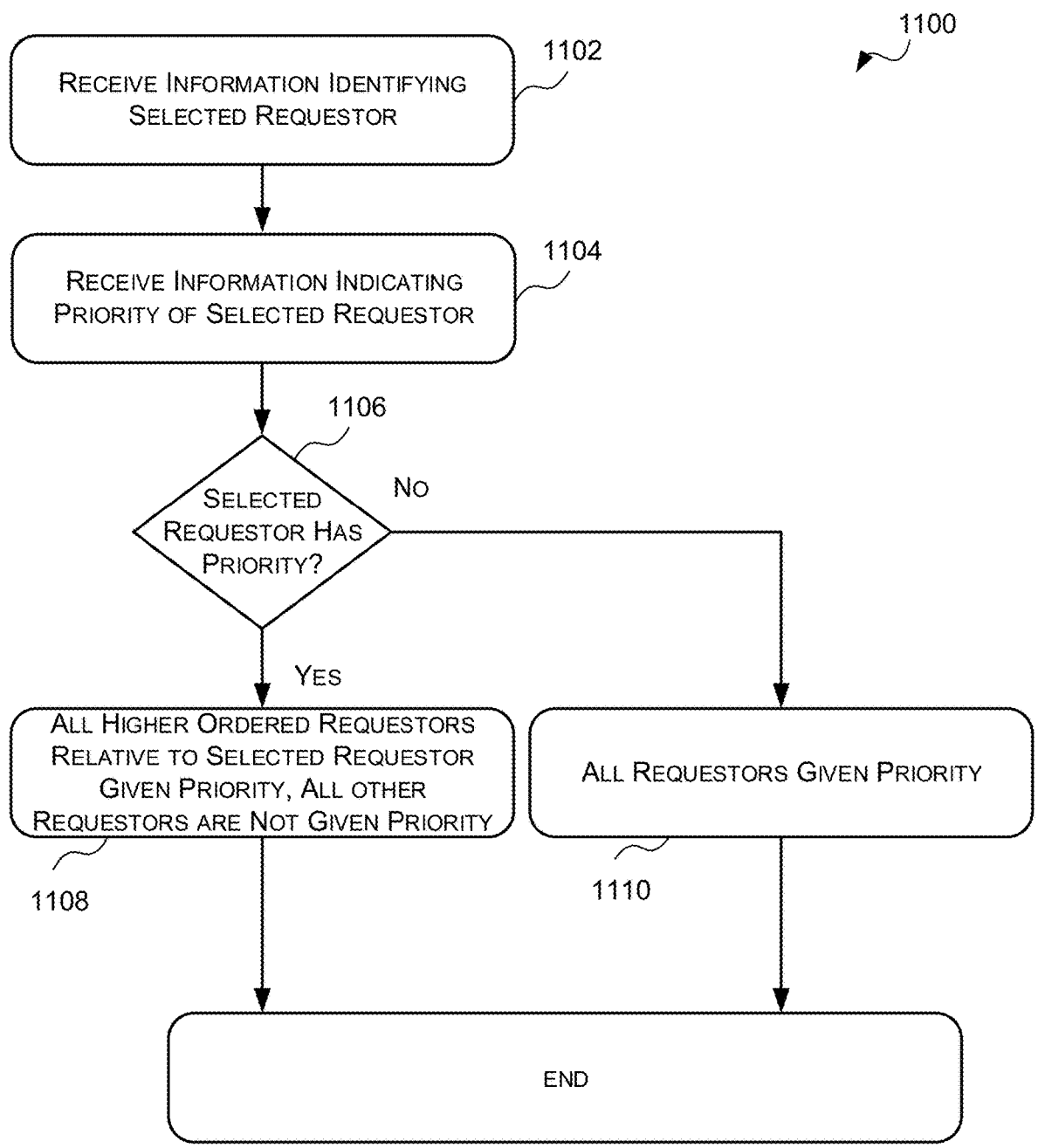
FIG. 11 is a flow diagram of a first example method for generating the priority information for the next cycle.

Reference is now made to FIG. 11 which illustrates a first example method 1100 for generating the priority information for the next cycle which may be implemented by the priority selection logic 204. In this method 1100 the priority information for the next cycle is based on the requestor selected in the current cycle and whether that requestor has priority. Specifically, in this method if the selected requestor has priority then in the next cycle all of the higher ordered requestors, relative to the selected requestor, are given priority and all other requestors are not given priority, and if the selected requestor does not have priority then in the next cycle all of the requestors are given priority.

The method 1100 begins at block 1102 where the priority selection logic 204 receives information that indicates which requestor was selected in the current cycle. In some cases, the requestor selection logic 202 may be configured to provide information (e.g. the requestor ID) identifying the selected requestor. At block 1104 the priority selection logic 204 also receives information indicating whether the requestor selected in the current cycle has priority. In some cases, the priority selection logic 204 may be configured to store the priority information generated in each cycle in a storage unit, such as a register 208. In these cases, the priority selection logic 204 determines whether the selected requestor has priority from the stored priority information. In other cases, the requestor selection logic 202 may be configured to provide all or a portion the priority information for the current cycle to the priority selection logic 204. For example, the requestor selection logic 202 may only provide the priority information that pertains to the selected requestor. In yet other cases, the requestor selection logic 202 may be configured to provide the active_priority information for the selected requestor (e.g. active_priority [RS]) since this will be output at the top of the binary decision tree along with the selected requestor ID. Once the priority selection logic 204 receives information indicating the priority of the requestor selected in the current cycle the method 1100 proceeds to block 1106.

At block 1106, the priority selection logic 204 determines, based on the received information, whether the requestor selected in the current cycle has priority. If it is determined that the selected requestor has priority the method 1100 proceeds to block 1108. If, however, it is determined that the selected requestor does not have priority then the method 1100 proceeds to block 1110.

At block 1108, after determining that the requestor selected in the current cycle has priority, the priority selection logic 204 generates priority information for the next cycle that gives priority (or high priority) to all the higher ordered requestors, relative to the selected requestor, and does not give priority to the remaining requestors. For example, if there are eight requestors, numbered from 0-7 and ordered numerically and requestor 5 is granted access in the current cycle then the priority selection logic may generate priority information for the next cycle that gives requestors 6 and 7 priority (or high priority) and does not give priority (or gives low priority) to requestors 0, 1, 2, 3, 4, 5. A priority mask that implements this may be [0 0 0 0 0 0 1 1]. The method 1100 then ends.

At block 1110, after determining that the requestor selected in the current cycle does not have priority, the priority selection logic 204 generates priority information for the next cycle that gives priority (or high priority) to all of the requestors. A priority mask that implements this for eight requestors may be [1 1 1 1 1 1 1 1]. The method 1100 then ends.

An arbitration scheme based on the modified requestor selection method described above with respect to FIG. 6 and the priority selection method described with respect to FIG. 11 is both fair (i.e. the requestors are granted access roughly equally often) and the maximum number cycles a requestor will have to wait before they are granted access to the resource is relatively low. Specifically, a requestor will only have to wait a maximum of N cycles where N is the number of requestors.

Figure 12:
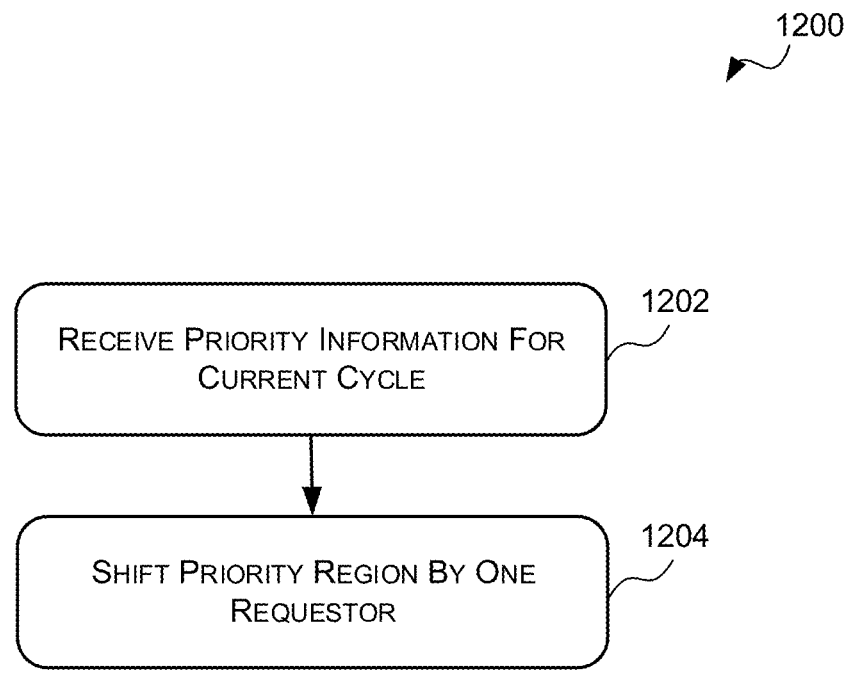
FIG. 12 is a flow diagram of a second example method for generating the priority information for the next cycle.

Reference is now made to FIG. 12 which illustrates a second example method 1200 for generating the priority information for the next cycle which may be implemented by the priority selection logic 204 of FIG. 2. In this method 1200 the priority selection logic 204 shifts the priority region by one requestor each cycle. This method is designed to work for cases: (i) where the priority information in any cycle has a block of 0's followed by a block of 1's or is all 1's; or (ii) only a single requestor has priority in any given cycle.

The method 1200 begins at block 1202 where the priority selection logic 204 receives the priority information for the current cycle. In some cases, the priority selection logic 204 may be configured to store the priority information generated each cycle. In these cases, the priority selection logic 204 may obtain the priority information for the current cycle from the stored priority information. In other cases, the requestor selection logic 202 may be configured to provide the priority information for the current cycle to the priority selection logic 204. Once the priority selection logic 204 has received the priority information for the current cycle the method 1200 proceeds to block 1204.

At block 1204, the priority selection logic 204 shifts the priority region (or priority block) in the priority information for the current cycle by one requestor to generate the priority information for the next cycle. The priority region is the contiguous block of one or more requestors that have high priority. Shifting the priority region by one requestor may comprise shifting the start of the priority region by one requestor to the next highest priority requestor. The start of the priority region may be the lowest ordered requestor in the priority region. The requestors may be considered to wrap around such that if the start of the priority region is the highest ordered requestor, that the priority region is shifted by one requestor by making the lowest ordered requestor the start of the priority region in the next cycle.

For example, where the priority information is configured to have a block of 0's followed by a block of 1's, or all 1's, shifting the priority region by one requestor may comprise removing priority from the lowest ordered requestor in the priority region and leaving all other priorities the same. Where the lowest ordered requestor in the priority region is the highest ordered requestor in the order all requestors may be given priority in the next cycle. For example, if the priority mask is [0 0 0 0 1 1 1 1] the priority region comprises requestors 4, 5, 6 and 7. If the requestors are ordered in numerical order the lowest ordered requestor in the priority region is requestor 4 and thus shifting the priority region by one requestor may comprise taking away priority from requestor 4 and leaving all other priorities the same which results in a priority mask of [0 0 0 0 0 1 1 1] for the next cycle. If, however, the priority mask is [0 0 0 0 0 0 0 1] the priority region comprises requestor 7. If the requestors are ordered in numerical order the lowest ordered requestor in the priority region is requestor 7, and since requestor 7 is the highest ordered requestor all requestors are given priority in the next cycle resulting in a priority mask of [1 1 1 1 1 1 1 1] for the next cycle.

In cases where only a single requestor is given priority in a cycle, shifting the priority region by one requestor may comprise only giving priority to the next highest ordered requestor, relative to the requestor that has priority in the current cycle, in the next cycle. The order of the requestors may be considered to wrap around so that the next highest ordered requestor for the highest ordered requestor may be the lowest ordered requestor. For example, if the priority mask is [0 0 0 1 0 0 0 0] the priority region comprises requestor 3. If the requestors are ordered in numerical order, then shifting the priority region by one requestor may comprise only granting priority to the next highest requestor (requestor 4) resulting in a priority mask of [0 0 0 0 1 0 0 0] in the next cycle. If the priority mask is [0 0 0 0 0 0 0 1] then the priority region is requestor 7. If the requestors are ordered in numerical order then shifting the priority region by one requestor may comprise only granting priority to the next highest requestor (requestor 0) in the next cycle resulting in a priority mask of [1 0 0 0 0 0 0 0] for the next cycle. Once the priority information for the next cycle has been generated the method 1200 ends.

An arbitration scheme based on the modified requestor selection method described above with respect to FIG. 6 and the priority selection method described with respect to FIG. 12 allows the priority selection logic to be small in hardware. It also ensures that no requestor has to wait more than N–1 cycles to be granted access to the resource where N is the number of requestors. However, the drawback of the method of FIG. 12 is that it is possible to construct a sequence where one requestor is granted access to the resource more often than other requestors so it is not as "fair" as an arbitration scheme based on the method of FIG. 11, for example, as higher ordered requestors will be granted access more often than lower ordered requestors.

Figure 13:
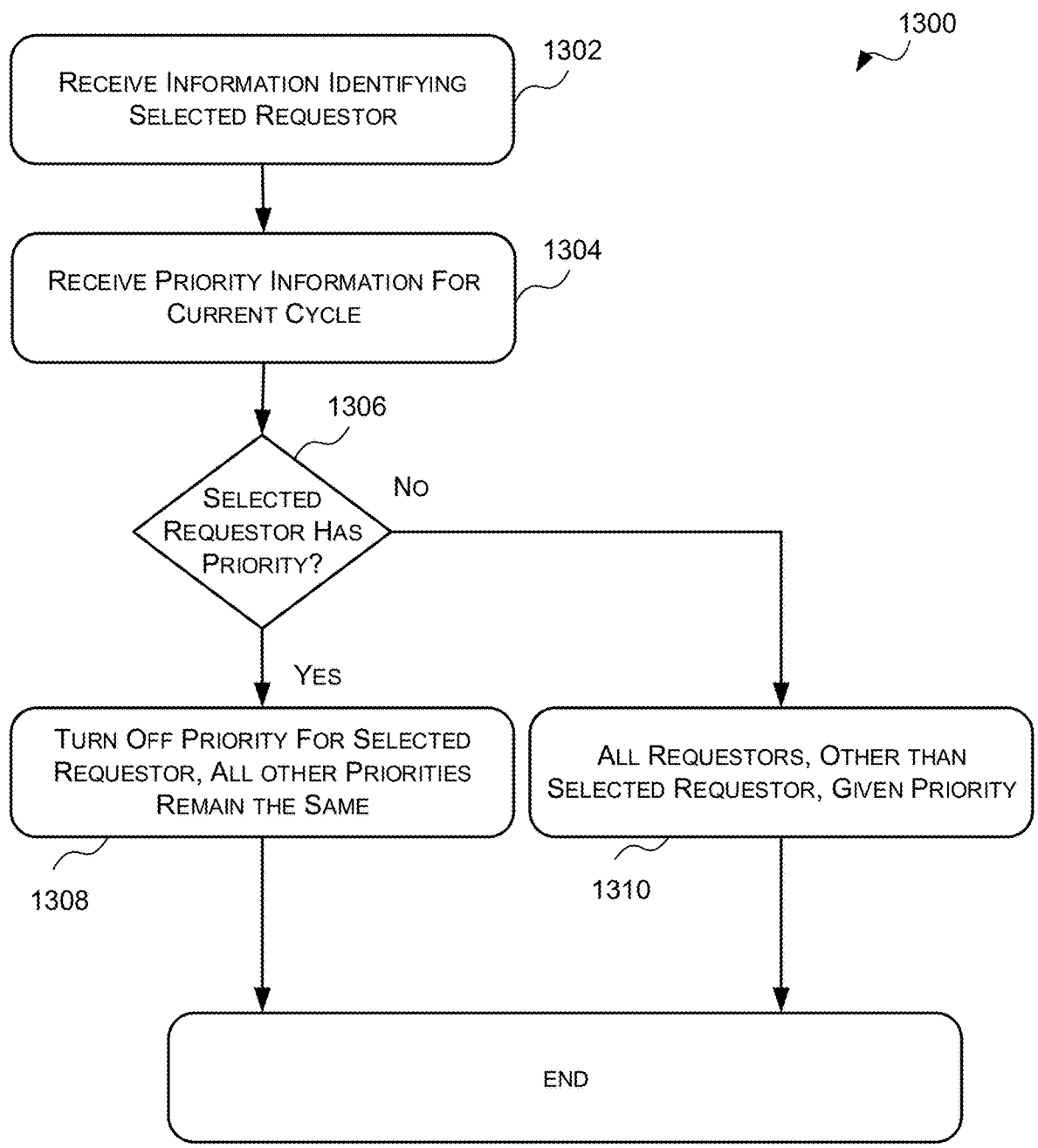
FIG. 13 is a flow diagram of a third example method for generating the priority information for the next cycle.

Reference is now made to FIG. 13 which illustrates a third example method 1300 for generating the priority information for the next cycle which may be implemented by the priority selection logic 204 of FIG. 2. In this method 1300, the priority information for the next cycle is based on the priority information in the current cycle and whether the selected requestor has priority. Specifically, if the selected requestor has priority then the priority information for the next cycle is the same as the current cycle except that the selected requestor does not have priority, and if the selected requestor does not have priority then in the next cycle all requestors, other than the selected requestor, have priority.

The method 1300 begins at block 1302 where the priority selection logic receives information that identifies the requestor selected in the current cycle. In some cases, the requestor selection logic 202 may be configured to provide information (e.g. the requestor ID) identifying the selected requestor. At block 1304, the priority selection logic 204 receives the priority information for the current cycle. In some cases, the priority selection logic 204 may be configured to store the priority information generated each cycle. In these cases, the priority selection logic 204 may obtain the priority information for the current cycle from the stored priority information. In other cases, the requestor selection logic 202 may be configured to provide the priority information for the current cycle to the priority selection logic 204. Once the priority selection logic 204 has received the priority information for the current cycle and information identifying the selected requestor the method 1300 proceeds to block 1306.

At block 1306, the priority selection logic 204 determines, based on the received information, whether the requestor selected in the current cycle has priority. If it is determined that the selected requestor does have priority the method 1300 proceeds to block 1308. If, however, it is determined that the selected requestor does not have priority then the method 1300 proceeds to block 1310.

At block 1308, after determining that the selected requestor has priority, the priority selection logic 204 generates priority information for the next cycle by taking the priority information for the current cycle and taking away priority from the selected requestor (e.g. the priority bit for the selected requestor may be set to '0'). For example, if the priority mask for the current cycle is [0 0 0 0 1 1 1 1] and requestor 6 is selected then the priority mask for the next cycle may be [0 0 0 0 1 1 0 1]. Once the priority information for the next cycle is generated the method 1300 ends.

At block 1310, after determining that the selected requestor does not have priority the priority selection logic 204 generates priority information for the next cycle wherein all requestors except the selected requestor have priority. For example, if requestor 2 is the selected requestor then the priority mask for the next cycle may be [1 1 0 1 1 1 1 1]. Once the priority information for the next cycle is generated the method 1300 ends.

An arbitration scheme based on the modified requestor selection method described above with respect to FIG. 6 and the priority selection method described with respect to FIG. 13 ensures that no requestor has to wait more than an order of 2N cycles to be granted access to the resource, where N is the number of requestors. However, the hardware required to implement the priority selection logic is more complex than that required to implement the method 1200 of FIG. 12.

Figure 14:
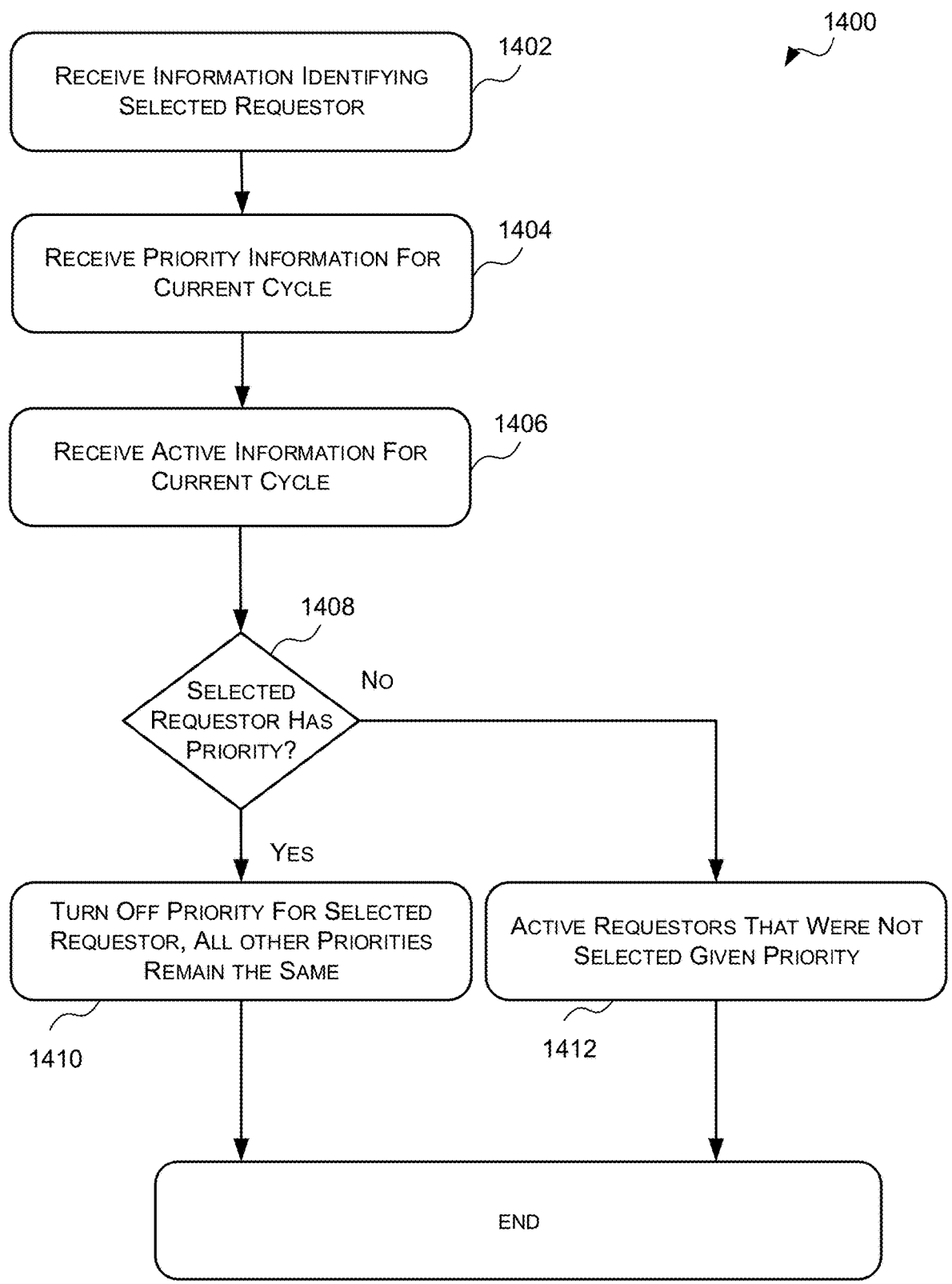
FIG. 14 is a flow diagram of a fourth example method for generating the priority information for the next cycle.

Reference is now made to FIG. 14 which illustrates a fourth example method 1400 for generating the priority information for the next cycle which may be implemented by the priority selection logic 204 of FIG. 2. In this method 1400 the priority information for the next cycle is based on the priority information in the current cycle and whether the selected requestor has priority. Specifically, if the selected requestor has priority then priority information for the next cycle is the same as the current cycle except that the selected requestor does not have priority, and if the selected requestor does not have priority then in the next cycle all requestors that were active in the current cycle, other than the selected requestor, have priority.

The method 1400 begins at block 1402 where the priority selection logic 204 receives information that identifies the requestor selected in the current cycle. In some cases, the requestor selection logic 202 may be configured to provide information (e.g. the requestor ID) identifying the selected requestor. At block 1404, the priority selection logic 204 receives the priority information for the current cycle. In some cases, the priority selection logic 204 may be configured to store the priority information generated each cycle. In these cases, the priority selection logic 204 may obtain the priority information for the current cycle from the stored priority information. In other cases, the requestor selection logic 202 may be configured to provide the priority information for the current cycle to the priority selection logic 204. At block 1406, the priority selection logic 204 receives the active information for the current cycle. In some cases, the requestor selection logic 202 may be configured to provide the active information for the current cycle to the priority selection logic 202. Once the priority selection logic 204 has received the priority information for the current cycle, the active information for the current cycle, and information identifying the selected requestor the method 1400 proceeds to block 1408.

At block 1408, the priority selection logic 204 determines, based on the received information, whether the requestor selected in the current cycle has priority. If it is determined that the selected requestor does have priority the method 1400 proceeds to block 1410. If, however, it is determined that the selected requestor does not have priority then the method 1400 proceeds to block 1412.

At block 1410, after determining that the selected requestor has priority the priority selection logic 204 generates priority information for the next cycle by taking the priority information for the current cycle and taking away priority from the selected requestor (e.g. the priority bit for the selected requestor may be set to '0'). For example, if the priority mask for the current cycle is [0 0 0 0 1 1 1 1] and requestor 6 is selected then the priority mask for the next cycle may be [0 0 0 0 1 1 0 1]. Once the priority information for the next cycle is generated the method 1400 ends.

At block 1412, after determining that the selected requestor does not have priority the priority selection logic 204 generates priority information for the next cycle wherein all requestors that are active in the current cycle, other than the selected requestor, are given priority and all other requestors are not given priority. For example, if the active mask is [0 1 1 1 0 0 0 0] indicating requestors 1, 2 and 3 are active and requestor 3 is the selected requestor then only requestors 1 and 2 are given priority since they are active, but were not selected, resulting in a priority mask for the next cycle of [0 1 1 0 0 0 0 0]. Once the priority information for the next cycle is generated the method 1400 ends.

An arbitration scheme based on the modified requestor selection method described above with respect to FIG. 6 and the priority selection method described with respect to FIG. 14 ensures that no requestor has to wait more than an order of 2N cycles to be granted access to the resource, where N is the number of requestors. However, the hardware required to implement the priority selection logic is more complex than that required to implement the method 1200 of FIG. 12.

The inventor has identified that for any priority scheme (such as, but not limited to, the priority schemes implemented by methods 1100, 1200, 1300, 1400 of FIGS. 11-14) where there is an upper bound for the number of priority requestors that can be selected before a low priority requestor must be selected, the maximum number of cycles a requestor has to wait to be granted access to a resource can be reduced by one cycle by treating the highest ordered requestor as never having priority. This means that the highest ordered requestor can never be the lowest ordered active requestor with priority. This prevents the highest ordered requestor from being granted access to the resource in multiple consecutive cycles (once when it is the lowest ordered active requestor with priority and once when it is the highest ordered active requestor) unless it is the only active requestor, in which case no other requestor is being delayed anyway. Note that any other requestor could still be granted access to the resource in two consecutive cycles, but in that case the highest ordered requestor will not have been requesting access, so the maximum delay is still reduced by one cycle. This may be implemented by (i) modifying the priority scheme so that the priority information generated for a cycle always indicates that the highest ordered requestor does not have priority, or by (ii) modifying the requestor selection logic 202 to treat the highest ordered requestor as not having priority regardless of the priority information for the cycle.

In some cases, the priority selection logic 204 may be configured to execute one of the methods 1100, 1200, 1300, 1400 described above with respect to FIGS. 11-14 only after determining that there was an active requestor in the current cycle. If the priority selection logic 204 determines that there was not an active requestor in the current cycle then the priority selection logic 204 may generate priority information for the next cycle that is the same as the priority information in the current cycle, or the priority selection logic 204 may generate new priority information for the next cycle. Since there are no requestors currently waiting to be served then it is not relevant what the priority information is for the next cycle. For example, in some cases, the priority selection logic 204 may be configured to generate priority information for the next cycle so that all requestors are given priority (e.g. a priority mask of all 1's such as [1 1 1 1 1 1 1 1]) when there are no active requestors in the current cycle. This may be simpler to implement in hardware than outputting the same priority information as the current cycle. However, it will be evident to a person of skill in the art that this is an example only and that the priority selection logic 204 may be configured to generate priority information for the next cycle in another manner when there are no active requestors in the current cycle.

Although the arbiter 106 of FIG. 1 is shown as a separate component from the resource 102, in other examples some, or all, of the arbiter 106 may form part of, or be integral to, the resource 102. For example, in some cases the requestor selection logic 202, the priority selection logic 204, and/or the data selection logic 206 may form part of the resource 102.

Figure 15:
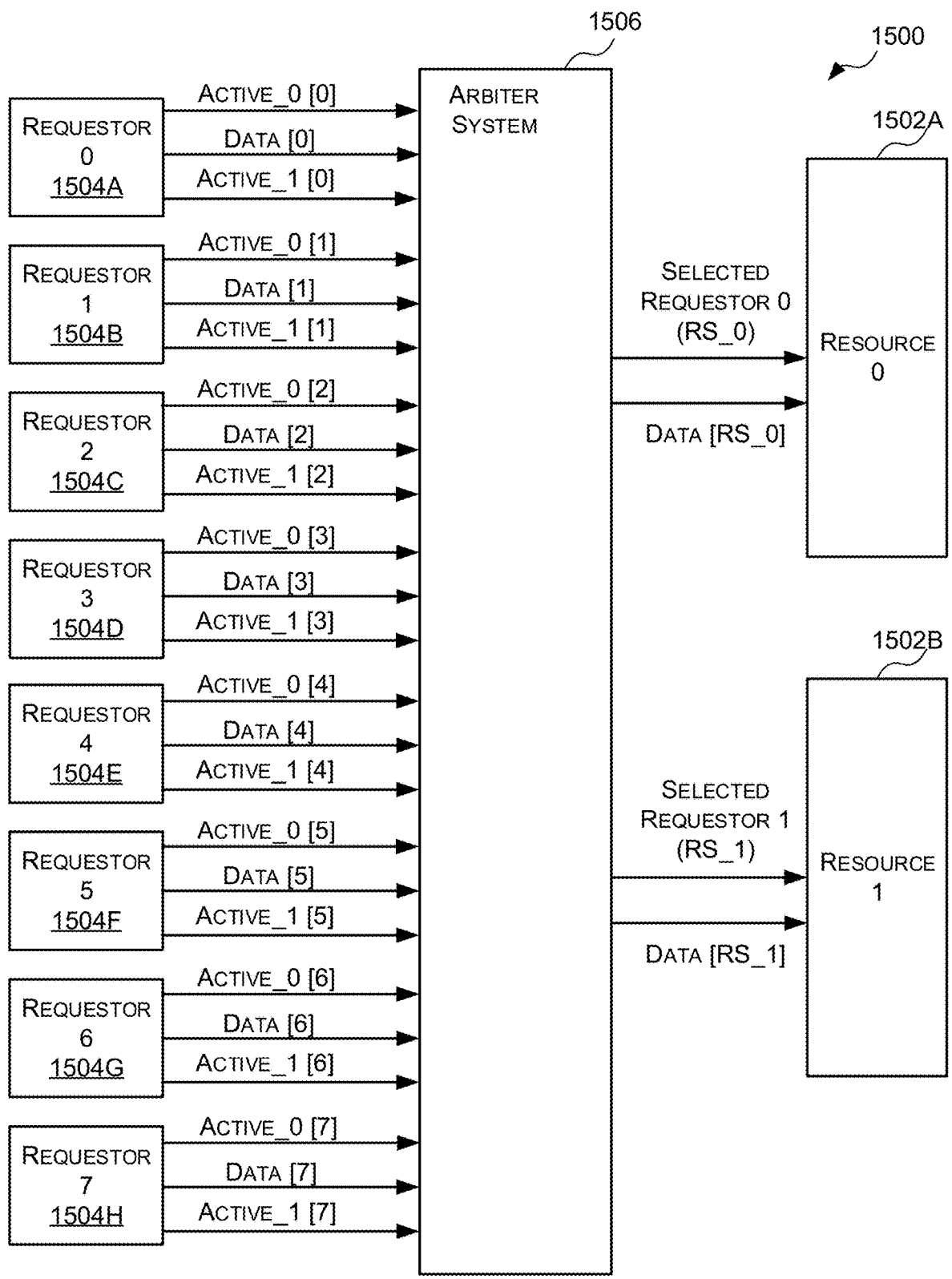
FIG. 15 is a block diagram of a system comprising an arbiter system that controls access to multiple shared resources.

In some cases, there may be multiple requestors which share multiple resources. For example, FIG. 15 shows an example computer system 1500 that comprises two resources 1502A-B shared by a plurality of requestors 1504A-1504H. In this example there are two shared resources numbered 0 and 1 and eight requestors numbered from 0 to 7, however, it will be evident to a person of skill in the art that the methods and techniques described herein may be applied to any system where there are two or more requestors that share two or more resources. In any cycle none, one, or more than one of the plurality of requestors 1504A-H may request access to the resources 1502A, 1502B. In this example when a requestor i wants to request access to resource 0 the requestor pulls the Active_0 [i] signal high and when a requestor i wants to request access to resource 1, the requestor pulls the Active_1 [i] signal high. When a requestor has requested access to a resource then the requestor is said to be active for that resource. As described above, there may be data associated with the requests which are to be processed by the relevant resource. The data associated with requestor i is denoted Data [i]. In some cases, as shown in FIG. 15 there may be only one data stream per requestor that is either forwarded to resource 0 or resource 1 as appropriate. However, in other cases there may be one data stream per requestor per resource.

An arbiter system 1506 arbitrates between the requestors 1504A-H and the shared resources 1502A-B. Specifically, each clock cycle the arbiter system 1506 selects an active requestor for each resource in accordance with an arbitration scheme and provides information to each resource identifying the selected requestor for that resource (e.g. the ID of the selected requestor) along with the associated data for the selected requestor.

In many cases, an arbiter system to arbitrate between a plurality of requestors and a plurality of resources will have a plurality of arbiters (one per resource) that perform parallel and independent arbitrations. In these cases, in each cycle each arbiter receives priority information for that resource and selects one of the active requestors for the corresponding resource based on the priority information and an arbitration scheme implemented by the arbiter. In some cases, the arbiters may implement different arbitration schemes. Since the priority information for a particular cycle is calculated in the previous cycle (e.g. the priority information for cycle 5 is calculated in cycle 4) the priority information is typically stored in a storage device or unit, such as, but not limited to, a register. Where there is one set of priority information per arbiter the arbiter system 1506 will have one storage device (e.g. register) per resource.

If, however, the arbiters are able to use the same priority information then only one storage element (e.g. register) may be required to store the priority information for the arbiter system 1506. The inventor has identified that common priority information can be used to select an appropriate requestor for multiple resources in systems where the requestors cannot make a request for more than one resource in a cycle, and if a request is not granted then the requestor continues to request access to the same resource until it has been granted access to that resource. Common priority information can be used in such systems because in such systems no requestor will be requesting access to two different resources in the same cycle and thus the relevant part of the priority information—the part that indicates the priority of the requestors that requested access to a resource in the current cycle but were not granted access to the resource—are independent and thus a common set of priority information can be generated by combining the relevant portions of the priority information for each resource.

Accordingly, described herein are methods and systems for generating a single common set of priority information which can be used to arbitrate between a plurality of requestors and a plurality of resources in a next cycle. Specifically, in the methods and systems described herein common priority information is generated by: generating priority information for the next cycle for each resource according to an arbitration scheme (which may be specific to that resource); generating relevant priority information for the next cycle for each resource based on the priority information for the next cycle for that resource, wherein the relevant priority information is the priority information that relates to relevant requestors (requestors that requested access to the resource in the current cycle but were not granted access to the resource); and then combining the relevant priority information for the next cycle for each resource. This works because each resource will have a different set of relevant requestors-requestors that have requested access in the current cycle but were not granted access to the resource in the current cycle—and thus the relevant priority information for each resource will not overlap. Since only one set of priority information is used to select between requestors for multiple resources the number of storage devices (e.g. registers) in the arbiter system can be reduced. Generally, the more resources there are, the more significant the savings.

It has been shown that this compression of several sets of priority information into a single set of priority information does not increase the maximum possible wait time and it does not significantly change the arbitration scheme compared to running several independent arbitrations in parallel. In fact, generating a single common set of priority information may decrease the area without increasing the delay.

Figure 16:
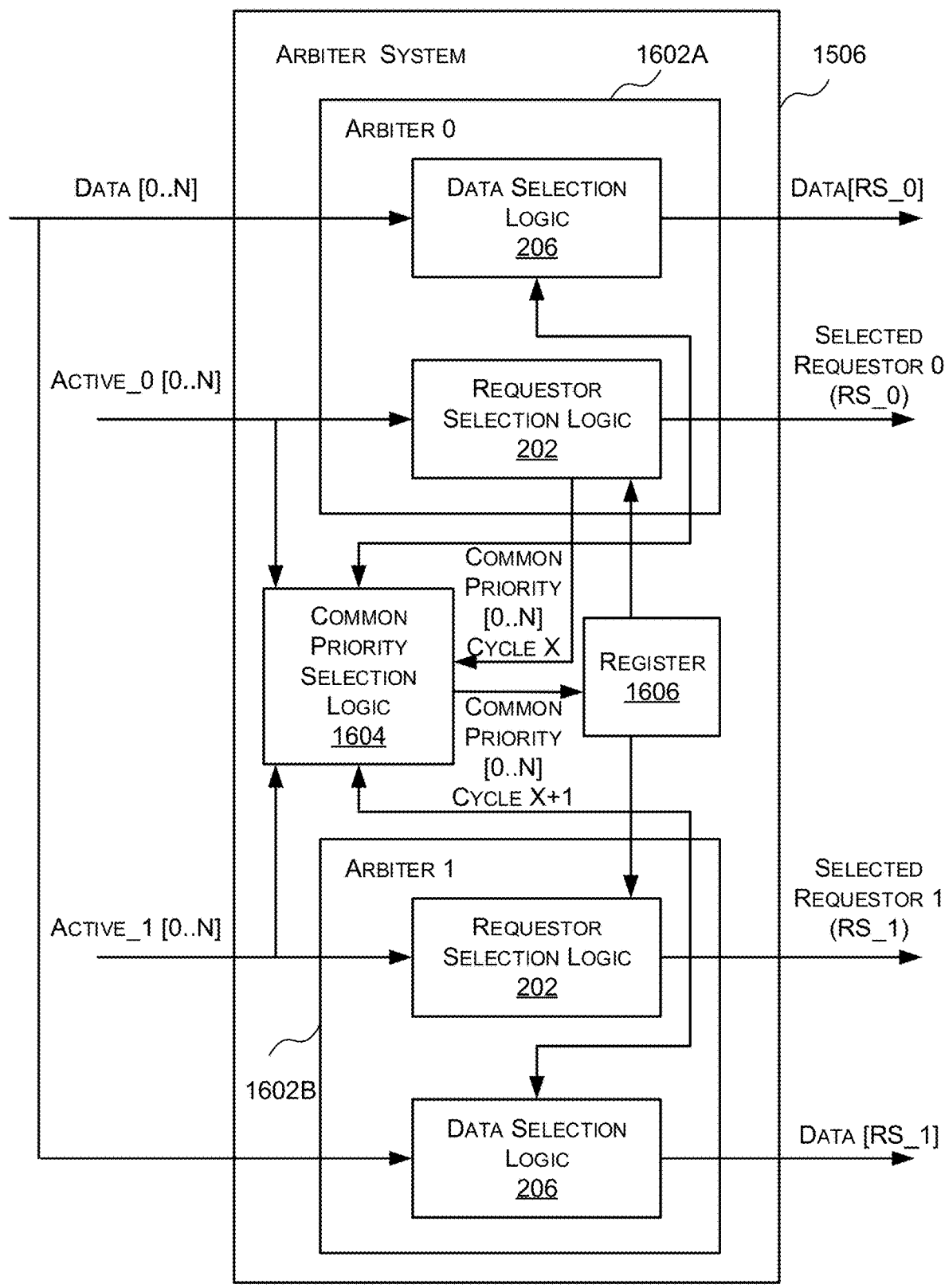
FIG. 16 is a block diagram of an example implementation of the arbiter system of FIG. 15 comprising common priority selection logic.

Reference is now made to FIG. 16 which illustrates an example arbiter system 1506 in which a single set of priority information is used to arbitrate between multiple requestors and multiple resources. In this example the arbiter system 1506 is configured to arbitrate between eight requestors which share two resources, but it will be evident to a person of skill in the art that the methods and techniques described herein could be equally applied to any system where there are at least two requestors and at least two resources. The arbiter system 1506 comprises an arbiter 1602A, 1602B per resource and common priority selection logic 1604. Each cycle each arbiter 1602A and 1602B receives active information for the corresponding resource that indicates which requestors have requested access to that resource in that cycle, and common priority information that indicates which requestors have priority in that cycle and selects an active requestor to be granted access to the resource based on the common priority information, the active information and an arbitration scheme. The arbiters may use the same or different arbitration schemes. Once an arbiter 1602A, 1602B has selected one of the active requestors for the corresponding resource, the arbiter 1602A, 1602B provides the corresponding resource with information identifying the selected requestor (e.g. an ID of the selected requestor) along with any relevant data (Data[RS_0] or Data [RS_1]) associated with the selected requestor.

One or more of the arbiters 1602A, 1602B may comprise the requestor selection logic 202 and/or the data selection logic 206 described above. Specifically, one or more of the arbiters 1602A, 1602B may be configured to select a requestor in accordance with the method 600 described above with respect to FIG. 6.

The common priority selection logic 1604 is configured to generate, each cycle, common priority information which is used by all of the arbiters 1602A, 1602B in the next cycle. The common priority selection logic 1604 may store the generated common priority information for the next cycle in a storage unit or device, such as a register 1606 which is accessible by the arbiters 1602A and 1602B. The common priority selection logic 1604 generates the common priority information for the next cycle by generating priority information for the next cycle for each resource according to an arbitration scheme (which may be specific to that resource); generating relevant priority information for the next cycle for each resource based on the priority information for the next cycle for that resource, wherein the relevant priority information for a resource is the priority information that relates to relevant requestors for that resource (requestors that requested access to the resource in the current cycle but were not granted access to the resource); and then combining the relevant priority information for the next cycle for each resource.

This will now be explained by way of example. In the example there are eight requestors numbered 0 to 7 and two shared resources numbered 0 and 1, requestors 0-3 request access to resource 0 in a cycle and requestor 0 is granted access to resource 0 in that cycle, and requestors 4-7 request access to resource 1 in the cycle and requestor 6 is granted access to resource 1. In this example, the relevant requestors for resource 0 are requestors 1-3 as they requested access to resource 0 but were not granted access to resource 0, and requestors 4-5 and 7 are the relevant requestors for resource 1 since they requested access to resource 1 but were not granted access to resource 1. In this example the common priority selection logic 1604 determines the priority of the requestors for resource 0 in the next cycle in accordance with an arbitration scheme for resource 0 and determines the priority of the requestors for resource 1 in the next cycle in accordance with an arbitration scheme for resource 1. The common priority selection logic 1604 then combines the priority for requestors 1-3 for resource 0 with the priority for requestors 4, 5 and 7 for resource 1 to generate the common priority information. All other non-relevant requestors (those that did not request access to any resource or that were granted access to a resource) are not given priority (e.g. are set to zero). An example implementation of common priority selection logic 1604 is described below with reference to FIG. 17, an example method for generating the common priority information which may be implemented by the common priority selection logic 1604 is described below with reference to FIG. 18, and an example generation of common priority information is described below with reference to FIG. 19.

Figure 17:
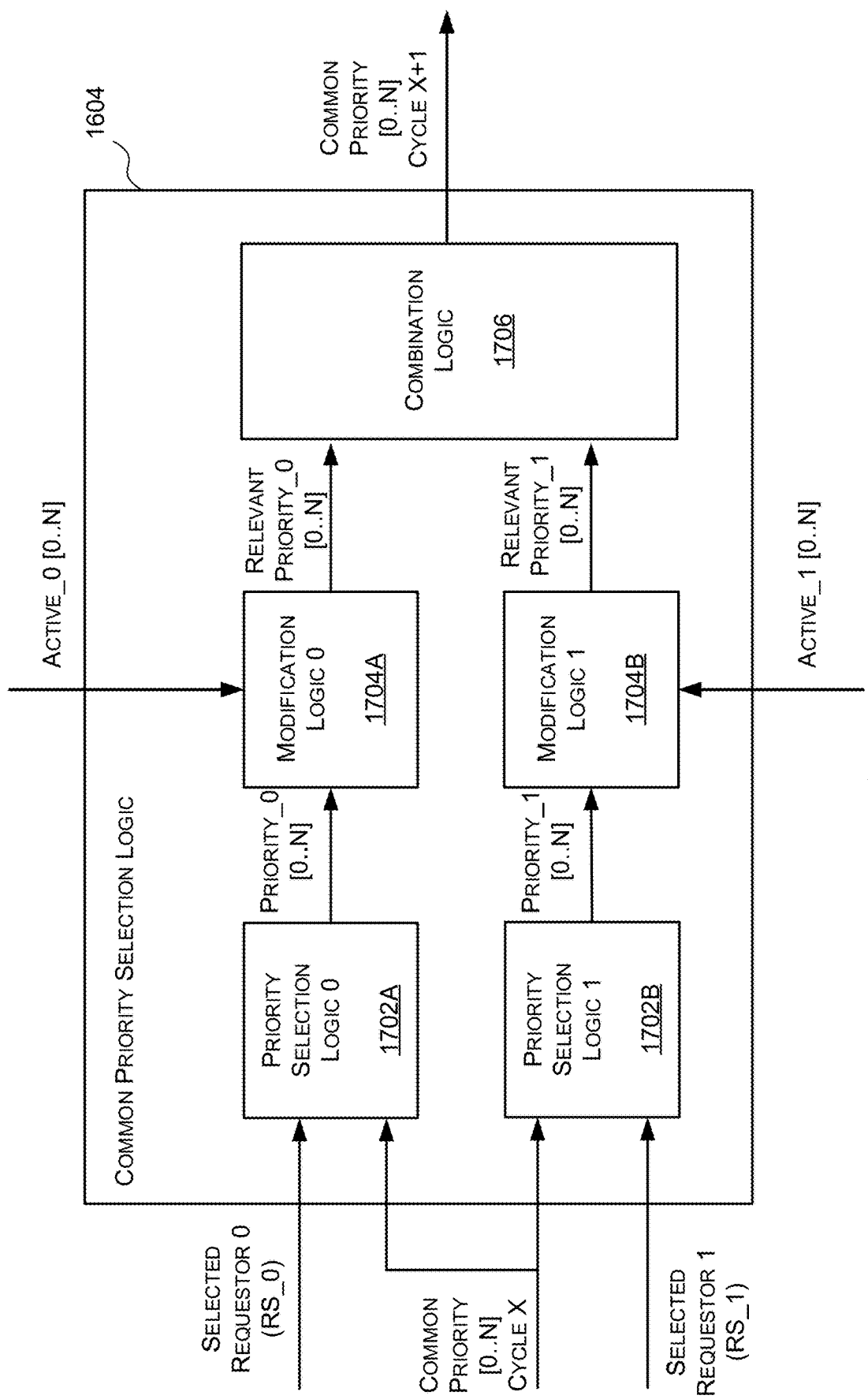
FIG. 17 is a block diagram of an example implementation of the common priority selection logic of FIG. 16.

Reference is now made to FIG. 17 which illustrates an example implementation of the common priority selection logic 1604 of FIG. 16. In this example the common priority selection logic 1604 comprises priority selection logic 1702A, 1702B for each resource, modification logic 1704A, 1704B for each resource and one combination logic block 1706. Each priority selection logic block 1702A, 1702B is configured to generate priority information for the next cycle for the corresponding resource in accordance with an arbitration scheme. The priority selection logic blocks 1702A, 1702B may implement the same or different arbitration schemes. In some cases, one or more of the priority selection logic blocks 1702A, 1702B may be implemented as the priority selection logic 204 described above. Specifically, one or more priority selection logic blocks 1702A, 1702B may be configured to generate the priority information in accordance with any of methods 1100, 1200, 1300, 1400 described above with respect to FIGS. 11-14. In the example shown in FIG. 17 each priority selection logic block 1702A, 1702B receives information identifying the selected requestor and the common priority information and generates the priority information for the next cycle for the associated resource based on this information, however, it will be evident to a person of skill in the art that this is an example only and the priority selection logic blocks 1702A, 1702B may receive additional information and/or different information and/or different priority selection blocks may receive different information.

Each modification logic block 1704A, 1704B receives the priority information for the next cycle for a corresponding resource and generates relevant priority information for the next cycle for that resource. As described above, the relevant priority information is the priority information related to the relevant requestors. In other words, the modification logic 1704A, 1704B essentially strips out the priority data related to the non-relevant requestors. In some cases, the modification logic 1704A, 1704B may do this by setting the priority information for the non-relevant requestors to zero. In some cases, one or more of the modification logic blocks 1704A, 1704B may be configured to generate the relevant priority information for the next cycle for a resource by performing a bit-wise AND operation between the priority information for the next cycle for that resource (priority_next_cycle_i) generated by the priority selection logic 1702A, 1702B and the active information for that resource (active_i) for the current cycle as shown in equation (1):

$$\text{relevant\_priority\_next\_cycle\_i} = \text{priority\_next\_cycle\_i} \wedge \text{active\_i} \quad (1)$$

The combination logic 1706 receives the relevant priority information for the next cycle for each resource and combines the relevant priority information for the next cycle for each resource to generate the common priority information. In some cases, the combination logic 1706 is configured to generate the common priority information for the next cycle by performing a bit-wise OR operation between the relevant priority information for the next cycle for each resource as shown in equation (2) where S is the set of all resources:

$$\text{common\_priority\_next\_cycle} = \vee_{i \in S} \text{ relevant\_priority\_next\_cycle\_i} \quad (2)$$

Figure 18:
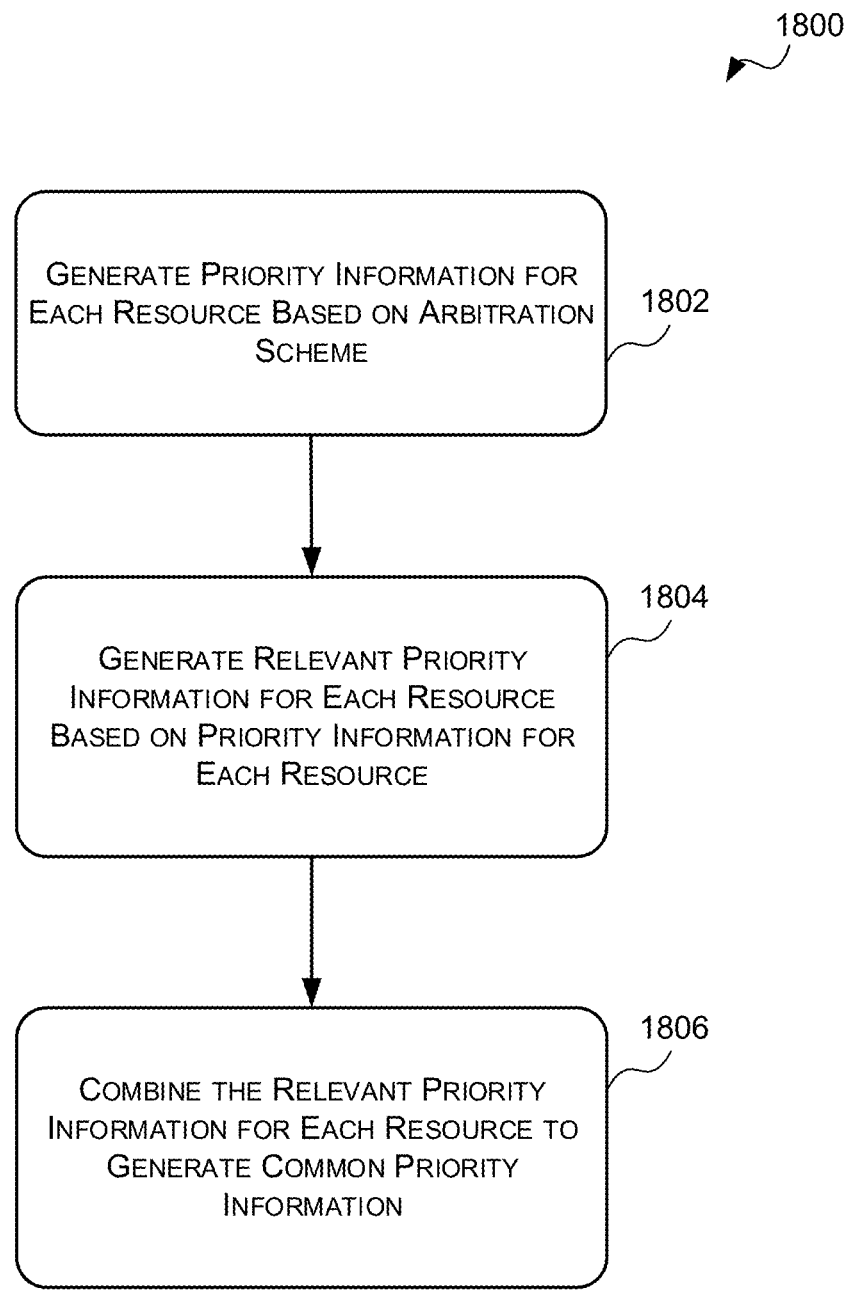
FIG. 18 is a flow diagram illustrating an example method of generating common priority information.

Reference is now made to FIG. 18 which illustrates an example method 1800 which may be implemented by the common priority selection logic 1604 to generate common priority information for a next cycle. The method 1800 begins at block 1802 where the common priority selection logic 1604 generates priority information for a next cycle for each resource according to an arbitration scheme (which may be specific to that resource). At block 1804 the common priority selection logic 1604 generates relevant priority information for the next cycle for each resource based on the priority information for the next cycle for that resource, wherein the relevant priority information is the priority information that relates to relevant requestors (requestors that requested access to the resource in the current cycle but were not granted access to the resource). At block 1806, the common priority selection logic 1604 combines the relevant priority information for the next cycle for each resource. The method 1800 then ends.

Reference is now made to FIG. 19 which illustrates the generation of common priority information for an example scenario where there are eight requestors numbered and ordered from 0 to 7 and two resources numbered 0 and 1. In this scenario the requestor granted access to a resource in a particular cycle is selected in accordance with the method 600 of FIG. 6 (i.e. the lowest ordered active requestor with priority is selected or the highest ordered active requestor is selected) and the priority for the next cycle for a resource is generated in accordance with the method 1100 of FIG. 11 (i.e. if a requestor with priority is selected then in the next cycle all higher ordered requestors relative to the selected requestor have priority, and otherwise all requestors have priority in the next cycle) except if the selected requestor does not have priority then the selected requestor is not given priority in the next cycle.

In a first example cycle (cycle 1) the active mask for resource 0 is [1 1 1 0 0 0 0 0] indicating that requestors 0, 1 and 2 are active for resource 0, the active mask for resource 1 is [0 0 0 0 0 1 1 1] indicating that requestors 5, 6 and 7 are active for resource 1, and the common priority mask for cycle 1 is [0 0 0 0 1 1 1 1] indicating that requestors 4, 5, 6 and 7 have priority (or high priority). In accordance with method 600, the selected requestor for resource 0 is requestor 2 since there are no active requestors with priority for resource 0 and requestor 2 is the highest ordered active requestor. As for resource 1, requestor 5 is the selected requestor because it is the lowest ordered active requestor with priority.

In accordance with the modified method 1100, the next priority for resource 0 is [1 1 0 1 1 1 1 1] because a requestor without priority was selected so all of the requestors are to have priority in the next cycle except the selected requestor (requestor 2). The next priority for resource 1 is [0 0 0 0 0 0 1 1] because a requestor with priority was selected so only those requestors that are higher ordered requestors, with respect to the selected requestor, have priority in the next cycle.

The relevant requestors for resource 0 are requestors 0 and 1 since they were the only requestors who requested access to resource 0 but were not granted access to resource 0. Therefore, the relevant priority information for the next cycle for resource 0 is [1 1000 0 0 0]—i.e. the priority for all of the non-relevant requestors is set to zero. Similarly, the relevant requestors for resource 1 are requestors 6 and 7 since they were the only requestors who requested access of resource 1 but were not granted access to resource 1. Therefore, the relevant priority information for the next cycle for resource 1 is [0 0 0 0 0 0 1 1]—i.e. the priority for all of the non-relevant requestors is set to zero.

The common priority for the next cycle is then [1 1 0 0 0 0 1 1]—the OR'd combination of the relevant priority information for resources 0 and 1.

In a second example cycle (cycle 2) the active mask for resource 0 is [1 1 0 1 1 0 0 0] indicating that requestors 0, 1, 3 and 4 are active for resource 0, the active mask for resource 1 is [0 0 1 0 0 0 1 1] indicating that requestors 2, 6 and 7 are active for resource 1, and the common priority mask for cycle 2 is [1 1 0 0 0 0 1 1] indicating that requestors 0, 1, 6 and 7 have priority (or high priority). In accordance with method 600, the selected requestor for resource 0 is requestor 0 since it is the lowest ordered active requestor with priority. As for resource 1, requestor 6 is the selected requestor because it is the lowest ordered active requestor with priority.

In accordance with the modified method 1100, the next priority for resource 0 is [0 1 1 1 1 1 1 1] because a requestor with priority was selected so all of the higher ordered requestors with respect to the selected requestor have priority in the next cycle. The next priority for resource 1 is [0 0 0 0 0 0 0 1] because a requestor with priority was selected so all of those requestors that are higher ordered with respect to the selected requestor have high priority in the next cycle.

The relevant requestors for resource 0 are requestors 1, 3 and 4 since they were the only requestors who requested access of resource 0 but were not granted access. Therefore, the relevant priority information for the next cycle for resource 0 is [0 1 0 1 1 0 0 0] —i.e. the priority for all of the non-relevant requestors is set to zero. Similarly, the relevant requestors for resource 1 are 2 and 7 since they were the only requestors who requested access of resource 1 but were not granted access to resource 1. Therefore, the relevant priority information for the next cycle for resource 1 is [0 0 0 0 0 0 0 1]—i.e. the priority for all of the non-relevant requestors is set to zero.

The common priority for the next cycle is then [0 1 0 1 1 0 0 1]—the OR'd combination of the relevant priority information for resources 0 and 1.

Figure 20:
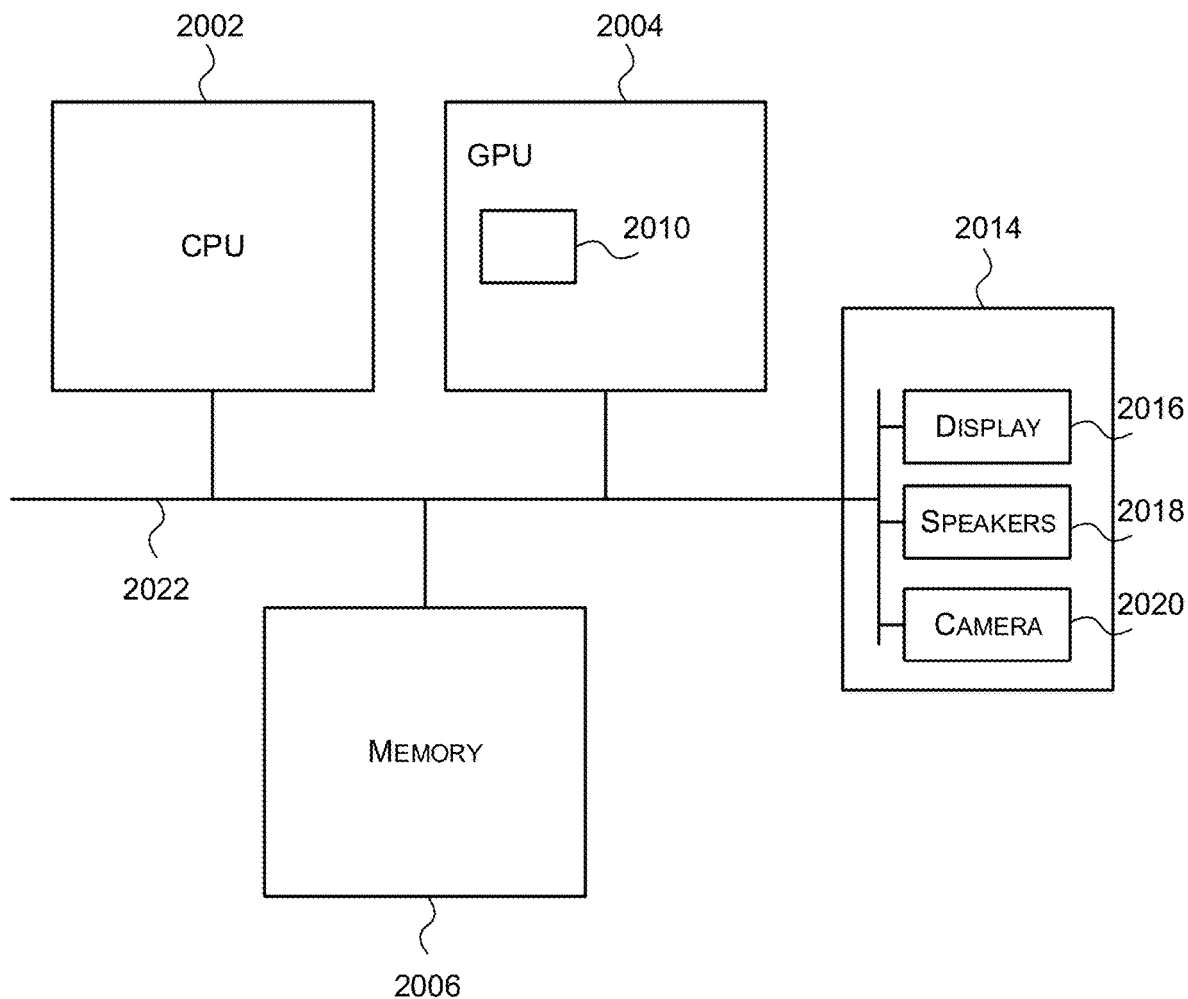
FIG. 20 is a block diagram of an example computer system in which the arbiters, arbiter systems and logic blocks described herein may be implemented.

FIG. 20 shows a computer system in which the arbiters, arbiter systems and/or logic blocks described herein may be implemented. The computer system comprises a CPU 2002, a GPU 2004, a memory 2006 and other devices 2014, such as a display 2016, speakers 2018 and a camera 2020. A logic block 2010 (corresponding to an arbiter, arbiter system, or any other logic block described herein) is implemented on the GPU 2004. In other examples, the logic block 2010 may be implemented on the CPU 2002. The components of the computer system can communicate with each other via a communications bus 2022.

The arbiters, arbiter systems, and logic blocks of FIGS. 2, 16 and 17 are shown as comprising a number of functional blocks. This is schematic only and is not intended to define a strict division between different logic elements of such entities. Each functional block may be provided in any suitable manner. It is to be understood that intermediate values described herein as being formed by a particular block need not be physically generated by the particular block at any point and may merely represent logical values which conveniently describe the processing performed by the block between its input and output.

The arbiters, arbiter systems, and logic blocks described herein may be embodied in hardware on an integrated circuit. The arbiters, arbiter systems, and logic blocks described herein may be configured to perform any of the relevant methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an arbiter, arbiter system or logic block configured to perform any of the relevant methods described herein, or to manufacture an arbiter, arbiter system or logic block comprising any apparatus described herein. An integrated circuit definition dataset may be, for example, an integrated circuit description.

Therefore, there may be provided a method of manufacturing, at an integrated circuit manufacturing system, an arbiter, an arbiter system and/or any logic block described herein. Furthermore, there may be provided an integrated circuit definition dataset that, when processed in an integrated circuit manufacturing system, causes the method of manufacturing an arbiter, arbiter system or logic block to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an arbiter will now be described with respect to FIG. 21. Similar processes may be used to manufacture an arbiter system, or any logic block described herein.

Figure 21:
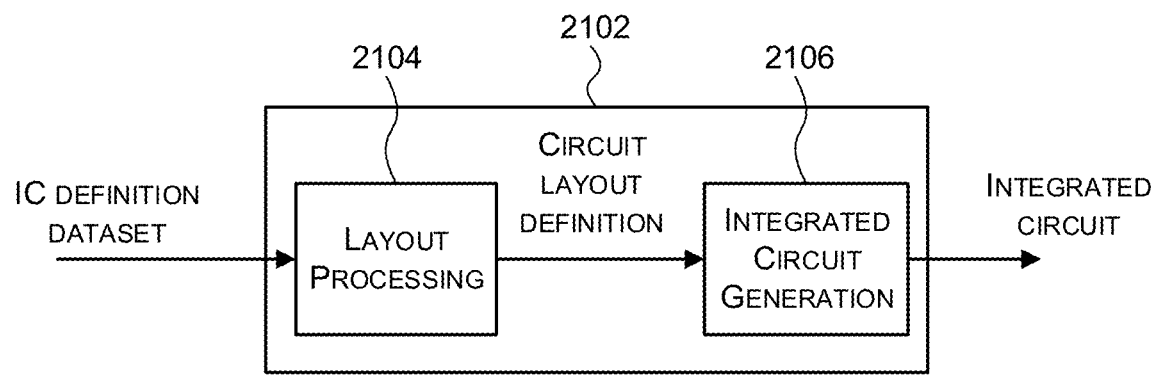
FIG. 21 is a block diagram of an example integrated circuit manufacturing system for generating an integrated circuit embodying any of the arbiters, arbiter systems, and logic blocks described herein.

FIG. 21 shows an example of an integrated circuit (IC) manufacturing system 2102 which is configured to manufacture an arbiter as described in any of the examples herein. In particular, the IC manufacturing system 2102 comprises a layout processing system 2104 and an integrated circuit generation system 2106. The IC manufacturing system 2102 is configured to receive an IC definition dataset (e.g. defining an arbiter as described in any of the examples herein), process the IC definition dataset, and generate an IC according to the IC definition dataset (e.g. which embodies an arbiter as described in any of the examples herein). The processing of the IC definition dataset configures the IC manufacturing system 2102 to manufacture an integrated circuit embodying an arbiter as described in any of the examples herein.

The layout processing system 2104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2104 has determined the circuit layout it may output a circuit layout definition to the IC generation system 2106. A circuit layout definition may be, for example, a circuit layout description.

The IC generation system 2106 generates an IC according to the circuit layout definition, as is known in the art. For example, the IC generation system 2106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2106 may be in the form of computer-readable code which the IC generation system 2106 can use to form a suitable mask for use in generating an IC.

The different processes performed by the IC manufacturing system 2102 may be implemented all in one location, e.g. by one party. Alternatively, the IC manufacturing system 2102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an arbiter without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 21 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 21, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of arbitrating between a plurality of requestors in a computing system that share a plurality of computing resources, the method comprising, using priority selection logic implemented in hardware:
generating, at said priority selection logic, for each resource, priority information for a next cycle based on an arbitration scheme, the priority information indicating which of the plurality of requestors has priority in the next cycle;
generating, at said priority selection logic, for each resource, relevant priority information for the next cycle by extracting from the priority information for the next cycle for that resource the information that relates to requestors that requested access to the resource in a current cycle and were not granted access to the resource in the current cycle; and
combining, at said priority selection logic, the relevant priority information for the next cycle for each resource to generate common priority information for the next cycle.

2. The method of claim 1, wherein generating the relevant priority information for the next cycle for a resource comprises modifying the priority information for the next cycle for that resource to indicate that any requestor that did not request access to the resource in the current cycle does not have priority.

3. The method of claim 2, wherein the priority information for the next cycle for a resource comprises a bit for each requestor that indicates whether that requestor has priority for that resource in the next cycle, and modifying the priority information for the next cycle for a resource comprises:
receiving active information for the resource that comprises a bit for each requestor that indicates whether that requestor requested access to the resource in the current cycle; and
performing a bitwise AND operation on the priority information for the next cycle for the resource and the active information for that resource to generate the relevant priority information for the next cycle for the resource.

4. The method of claim 1, wherein the relevant priority information for the next cycle for each resource comprises a bit for each of the requestors indicating whether that requestor has priority in the next cycle, and combining the relevant priority information for the next cycle for the resources to generate the common priority information comprises performing a bit-wise OR operation on the relevant priority information for the next cycle for all the resources.

5. The method of claim 1, wherein generating priority information for a first set of requestors of the plurality of requestors for at least one resource in accordance with an arbitration scheme comprises:
receiving information identifying a requestor granted access to the resource in the current cycle;
receiving priority information for the current cycle for the resource that indicates which requestors have priority in the current cycle;
determining from the information identifying the requestor granted access to the resource in the current cycle and the priority information for the current cycle for the resource whether the requestor granted access to the resource in the current cycle has priority in the current cycle;

in response to determining that the requestor granted access to the resource in the current cycle has priority in the current cycle, generating first priority information for the first set of requestors for the next cycle for the resource; and in response to determining that the requestor granted access to the resource in the current cycle does not have priority in the current cycle, generating second priority information for the first set of requestors for the next cycle for the resource.

6. The method of claim 5, wherein:

the plurality of requestors are ordered from lowest to highest according to one or more criteria; and for at least one resource:

the first priority information for the first set of requestors for the next cycle for the resource indicates that all higher ordered requestors in the first set of requestors relative to the requestor granted access to the resource in the current cycle have priority in the next cycle, and the second priority information for the first set of requestors for the next cycle for the resource indicates that all of the requestors in the first set of requestors, except the requestor that was granted access to the resource in the current cycle, have priority in the next cycle.

7. The method of claim 5, wherein for at least one resource the first priority information for the first set of requestors for the next cycle for the resource indicates a same set of requestors in the first set of requestors that have priority in the current cycle have priority in the next cycle, except for the requestor granted access to the resource in the current cycle; and the second priority information for the first set of requestors for the next cycle for the resource indicates all requestors in the first set of requestors have priority in the next cycle except the requestor that was granted access to the resource in the current cycle.

8. The method of claim 5, wherein for at least one resource the first priority information for the first set of requestors for the next cycle for the resource indicates a same set of requestors in the first set of requestors that have priority in the current cycle have priority in the next cycle, except the requestor granted access to the resource in the current cycle; and the second priority information for the first set of requestors for the next cycle for the resource indicates those requestors in the first set of requestors that requested access to the resource in the current cycle have priority in the next cycle except the requestor granted access to the resource in the current cycle.

9. The method of claim 5, wherein the first set of requestors comprises all of the plurality of requestors.

10. The method of claim 5, wherein:

the plurality of requestors are ordered from lowest to highest according to one or more criteria;

the first set of requestors comprises all of the plurality of requestors except a highest ordered requestor; and generating priority information for the highest ordered requestor for the next cycle for the resource comprises generating information indicating the highest ordered requestor does not have priority.

11. An arbiter system for arbitrating between a plurality of requestors in a computing system that share a plurality of computing resources, the arbiter system comprising:

priority selection logic implemented in hardware, the hardware comprising:

priority generation logic for each resource that is configured to generate priority information for the next cycle based on an arbitration scheme, the priority information indicating which of the plurality of requestors has priority in the next cycle, modification logic for each resource that is configured to generate relevant priority information for the next cycle by extracting from the priority information for the next cycle for that resource information that relates to requestors that requested access to the resource in a current cycle and were not granted access to the resource in the current cycle, and combination logic configured to combine the relevant priority information for each resource to generate common priority information for the next cycle.

12. The arbiter system of claim 11, wherein the modification logic for a resource is configured to generate the relevant priority information for the next cycle for the resource by modifying the priority information for the next cycle for that resource to indicate that any requestor that did not request access to the resource in the current cycle does not have priority.

13. The arbiter system of claim 12, wherein the priority information for the next cycle for a resource comprises a bit for each requestor that indicates whether that requestor has priority for that resource in the next cycle, and the modification logic is configured to modify the priority information for the next cycle for the resource by:

receiving active information for the resource that comprises a bit for each requestor that indicates whether that requestor requested access to the resource in the current cycle; and performing a bitwise AND operation on the priority information for the resource and the active information for that resource to generate the relevant priority information for the next cycle for the resource.

14. The arbiter system of claim 11, wherein the relevant priority information for the next cycle for each resource comprises a bit for each of the requestors indicating whether that requestor has priority in the next cycle, and the combination logic is configured to combine the relevant priority information for the next cycle for the resources to generate the common priority information by performing a bit-wise OR operation on the relevant priority information for the next cycle for all the resources.

15. The arbiter system of claim 11, wherein the priority generation logic for at least one resource is configured to generate the priority information for a first set of requestors of the plurality of requestors for the next cycle by:

receiving information identifying a requestor granted access to the resource in the current cycle;

receiving priority information for the current cycle for the resource that indicates which requestors have priority in the current cycle;

determining from the information identifying the requestor granted access to the resource in the current cycle and the priority information for the current cycle for the resource whether the requestor granted access to the resource in the current cycle has priority in the current cycle;

in response to determining that the requestor granted access to the resource in the current cycle has priority in the current cycle, generating first priority information for the first set of requestors for the next cycle for the resource; and in response to determining that the requestor granted access to the resource in the current cycle does not have priority in the current cycle, generating second priority information for the first set of requestors.

16. The arbiter system of claim 15, wherein for at least one resource the first priority information for the first set of requestors for the next cycle for the resource indicates a same set of requestors in the first set of requestors that have priority in the current cycle have priority in the next cycle except for the requestor granted access to the resource in the current cycle; and the second priority information for the first set of requestors for the next cycle for the resource indicates all requestors in the first set of requestors have priority in the next cycle, except the requestor granted access to the resource in the current cycle or the second priority information for the first set of requestors for the next cycle for the resource indicates those requestors in the first set of requestors that requested access to the resource in the current cycle have priority in the next cycle except the requestor granted access to the resource in the current cycle.

17. A non-transitory computer readable storage medium having stored thereon computer readable instructions that, when executed at an arbiter system comprising priority selection hardware and a plurality of arbiters, cause the arbiter system to perform the method as set forth in claim 1.

18. A non-transitory computer readable storage medium having stored thereon a computer readable dataset description of the arbiter system as set forth in claim 11 that, when processed in an integrated circuit manufacturing system, causes the integrated circuit manufacturing system to manufacture an integrated circuit embodying the arbiter system.

* * * * *